United States Patent
Keng et al.

(10) Patent No.: US 8,819,559 B2
(45) Date of Patent: Aug. 26, 2014

(54) SYSTEMS AND METHODS FOR SHARING MULTIMEDIA EDITING PROJECTS

(75) Inventors: Shih-Ling Keng, Taipei (TW);
Jau-Hsiung Huang, Sindian (TW);
Chao-Liang Hsu, Pingzhen (TW);
Kuo-Chiang Hsieh, New Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 348 days.

(21) Appl. No.: 13/166,932

(22) Filed: Jun. 23, 2011

(65) Prior Publication Data

US 2011/0276881 A1    Nov. 10, 2011

Related U.S. Application Data

(63) Continuation-in-part of application No. 12/486,864, filed on Jun. 18, 2009.

(51) Int. Cl.
| | | |
|---|---|---|
| *G06F 3/00* | (2006.01) | |
| *G06F 15/16* | (2006.01) | |
| *G11B 27/034* | (2006.01) | |
| *G11B 27/34* | (2006.01) | |
| *G11B 27/32* | (2006.01) | |
| *G11B 27/10* | (2006.01) | |

(52) U.S. Cl.
CPC ...... *G11B 27/034* (2013.01); *G11B 2220/2541* (2013.01); *G11B 27/34* (2013.01); *G11B 27/322* (2013.01); *G11B 27/10* (2013.01)
USPC ........................................................ 715/723

(58) Field of Classification Search
USPC ........................................................ 715/723
See application file for complete search history.

(56) References Cited

U.S. PATENT DOCUMENTS

| 7,142,225 | B1 * | 11/2006 | Boler et al. | 345/619 |
|---|---|---|---|---|
| 2002/0002562 | A1 * | 1/2002 | Moran et al. | 707/500 |
| 2007/0030286 | A1 * | 2/2007 | Hirasaka | 345/619 |
| 2007/0179979 | A1 | 8/2007 | Folgner et al. | |

FOREIGN PATENT DOCUMENTS

| WO | WO 2008/033840 | 3/2008 |
|---|---|---|
| WO | WO 2008/101038 | 8/2008 |

* cited by examiner

*Primary Examiner* — Peiyong Weng
(74) *Attorney, Agent, or Firm* — McClure, Qualey & Rodack, LLP

(57) ABSTRACT

Various embodiments for sharing multimedia editing projects are described. One embodiment is a method performed at a server for sharing video editing techniques by a user. The method comprises receiving a project description file at the server, wherein the project description file is generated during editing of multimedia content by a first editing system, the project description file comprising information relating to special effect objects applied to the edited multimedia content by the first editing system. The method further comprises providing all or a portion of a timeline-based template according to the project description file, wherein the timeline-based template comprises a timeline and object type designators corresponding to the special effect objects specified by the first editing system, wherein representations of the object type designators are displayed along the timeline. The method further comprises transmitting the timeline-based template from the server to a second editing system.

26 Claims, 17 Drawing Sheets

SYSTEMS AND METHODS FOR SHARING MULTIMEDIA EDITING PROJECTS

CROSS-REFERENCE TO RELATED APPLICATION

This application is a continuation-in-part of co-pending U.S. patent application Ser. No. 12/486,864 entitled "SYSTEMS AND METHODS FOR SHARING MULTIMEDIA EDITING PROJECTS," filed Jun. 18, 2009, which is incorporated by reference herein in its entirety.

TECHNICAL FIELD

The present disclosure generally relates to editing multimedia content and more particularly, relates to systems and methods for sharing multimedia editing projects.

BACKGROUND

With the vast array of video editing tools available, many people can readily edit existing video and incorporate special effects to customize videos and to produce stylish graphics. These videos may later be published for others to view. In many cases, however, an individual may want a more professional look before sharing the video with friends and family. Use of professional video editing services may not be a feasible alternative in many instances due to cost. One common problem with traditional video editing solutions, however, is the degree of time and complexity involved in the overall editing process. Therefore, there exists a need for improving a user's ability to share video editing techniques with others.

SUMMARY

Briefly described, one embodiment, among others, is a method performed at a server for sharing video editing techniques by a user. The method comprises receiving a project description file at the server, wherein the project description file is generated during editing of multimedia content by a first editing system, the project description file comprising information relating to special effect objects applied to the edited multimedia content by the first editing system. The method further comprises providing all or a portion of a timeline-based template according to the project description file, wherein the timeline-based template comprises a timeline and object type designators corresponding to the special effect objects specified by the first editing system, wherein representations of the object type designators are displayed along the timeline. The method further comprises transmitting the timeline-based template from the server to a second editing system.

Another embodiment is a method performed at a server for sharing video editing techniques. The method comprises receiving, by the server, a project description file generated at a first editing system, the project description file comprising information relating to special effect objects applied to multimedia content by the first editing system. The method further comprises providing, by the server, all or a portion of a timeline-based template derived from the project description file to a second editing system, wherein the timeline-based template comprises a timeline and object type designators corresponding to the special effect objects specified by the first editing system, wherein representations of the object type designators are displayed along the timeline. The method further comprises receiving by the server from the second editing system a second multimedia content with special effect objects applied using the timeline-based template.

Another embodiment is a system for sharing multimedia editing techniques, comprising a project sharing application executable in a server configured to receive a project description file from a first editing system, the project description file comprising information relating to application of special effects objects to a multimedia file and a template generator configured to derive a timeline-based template based on the project description file, wherein the server is configured to send the timeline-based template to a second editing system.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
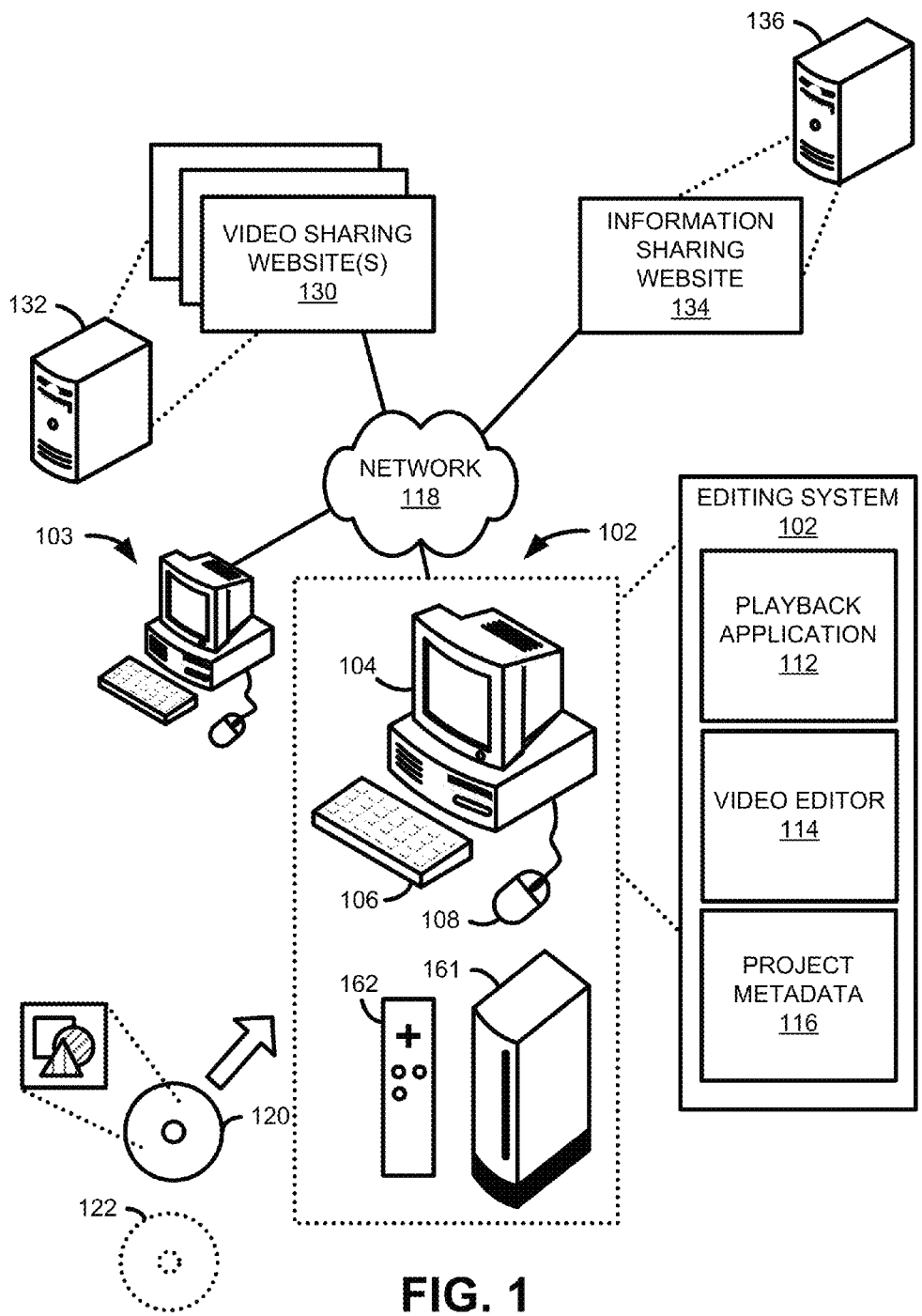
FIG. 1 depicts a top-level diagram of a system for sharing multimedia editing techniques.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

One perceived shortcoming with traditional multimedia editing solutions is the degree of time and complexity involved in the overall editing process. Various embodiments are thus described where a user uploads a multimedia editing project in order to allow other users to view and track the editing process of multimedia content. In this regard, the embodiments described provide users with a means for sharing creative ideas in editing multimedia content so that those with more extensive experience in editing multimedia content have a forum for sharing their techniques with others. In the following discussion, a description of the various components of a networked environment is described, followed by a discussion of the operation of these components. It should be understood that, as used herein, "video" or "multimedia content" may include, but is not limited to, video data, audio data, text, still images, or combinations of such content.

Reference is made to FIG. 1, which depicts a top-level diagram of a system for sharing multimedia editing techniques. For some embodiments, a system for sharing multimedia editing techniques may be incorporated in an editing system 102 such as, for example, a desktop computer, a computer workstation, or a laptop. The editing system 102 may include a display 104 and input devices such as a keyboard 106 and a mouse 108. In other embodiments, the editing system 102 may comprise a video gaming console 161, which includes a video game controller 162. For such embodiments, the video gaming console 161 may be connected to a television (not shown) or other display. Generally, the editing system 102 may comprise a playback application 112 such as CyberLink's PowerDirector®. The playback application 112 is generally embodied on a computer readable medium and executable by a processor that allows a user to view a movie title, input special effects, and upload a video editing project. The editing system 102 may further comprise project metadata 116, which is created and collected in a project description file, for example, during the video editing process using an editing system 114.

The project metadata 116 may be used to specify certain attributes of a video and may be utilized in a wide variety of ways. As non-limiting examples, metadata might contain miscellaneous information about a given video such as the chapter list, content rating (e.g., General (G), Parental Guidance (PG), PG-13, Restricted (R)), performers (actors, actresses, musicians, etc.), and a brief synopsis of the movie. Other non-limiting examples include information relating to the multimedia editing objects such as special effects, audio, and subtitles incorporated into video clips. Such information may comprise, for example, timing data of each of the special effects, audio, and subtitles and the category of special effect. By way of illustration, the metadata might specify that a customized subtitle is shown at start time 00:00:31 and disappears at an end time 00:00:41 in a particular video. As another illustration, the metadata might specify that a picture-in-picture (PiP) object such as a star object is shown in the video at a start time 00:00:45 and disappears at an end time 00:00:55. With exemplary embodiments described, project metadata 116 may be generated during the video editing process and associated with a video editing project. Note that the video editing project may comprise a combination of project metadata 116 and existing metadata associated with a particular video.

The editing system 102 in FIG. 1 reads multimedia content stored in any of a variety of formats or stored on various types of storage media. As non-limiting examples, the editing system 102 may be configured to read media content encoded in such formats as Digital Video Disc (DVD), Video CD (VCD), High Definition DVD (HD-DVD), BLU-RAY Disc, and China Blue High-Definition (CBHD) stored on a storage medium 120. In some embodiments, the editing system 102 may also be configured to read multimedia content from managed copies 122 of an HD-DVD or a BLU-RAY Disc. The phrase "managed copy" refers to authorized copies of multimedia content used as a reference video for editing purposes. The above exemplary formats are merely examples, and it is intended that the various embodiments described herein cover multimedia content in general.

The editing system 102 receives the storage media 120 or managed copies 122 containing the multimedia content and plays back the multimedia for a user to view and edit. In some embodiments, the editing system 102 may be coupled to a network 118, such as the Internet. For some implementations, the networked environment depicted in FIG. 1 may be configured to incorporate cloud computing, whereby hosted services are delivered via the Internet. In accordance with some embodiments, a user uploads an edited multimedia content to one or more video sharing/content portal websites 130, such as, for example, YouTube. Such websites 130 may be hosted on a web portal server 132 and where web pages are rendered locally on the display 104 of a computer 102.

The networked environment shown in FIG. 1 further comprises a information sharing website 134, such as, for example, CyberLink's® DirectorZone or other Web 2.0 websites, where users can upload a project description file containing project metadata 116 to and share their video editing techniques with others. For some implementations, project description files may include a mapping table that specifies a particular multimedia editing object, a corresponding description, and a corresponding timing data. As such, the information sharing website 134 may serve as a forum for users to share their video editing projects. Note that for some implementations, the information sharing website and the video sharing/content portal website may be integrated into a single website. Also shown in FIG. 1 is a viewing system or client 103, which allows a second user to view edited multimedia content created on the editing system 102. The viewing system 103 may also be connected to the network 118. Through the network 118, the second user may utilize the viewing system or client 103 to view both the edited multimedia content and the project metadata including multimedia editing objects such as special effects, audio and subtitles incorporated by the first user by accessing the information sharing website 134. The edited multimedia content may comprise a combination of edited video and audio.

Figure 2:
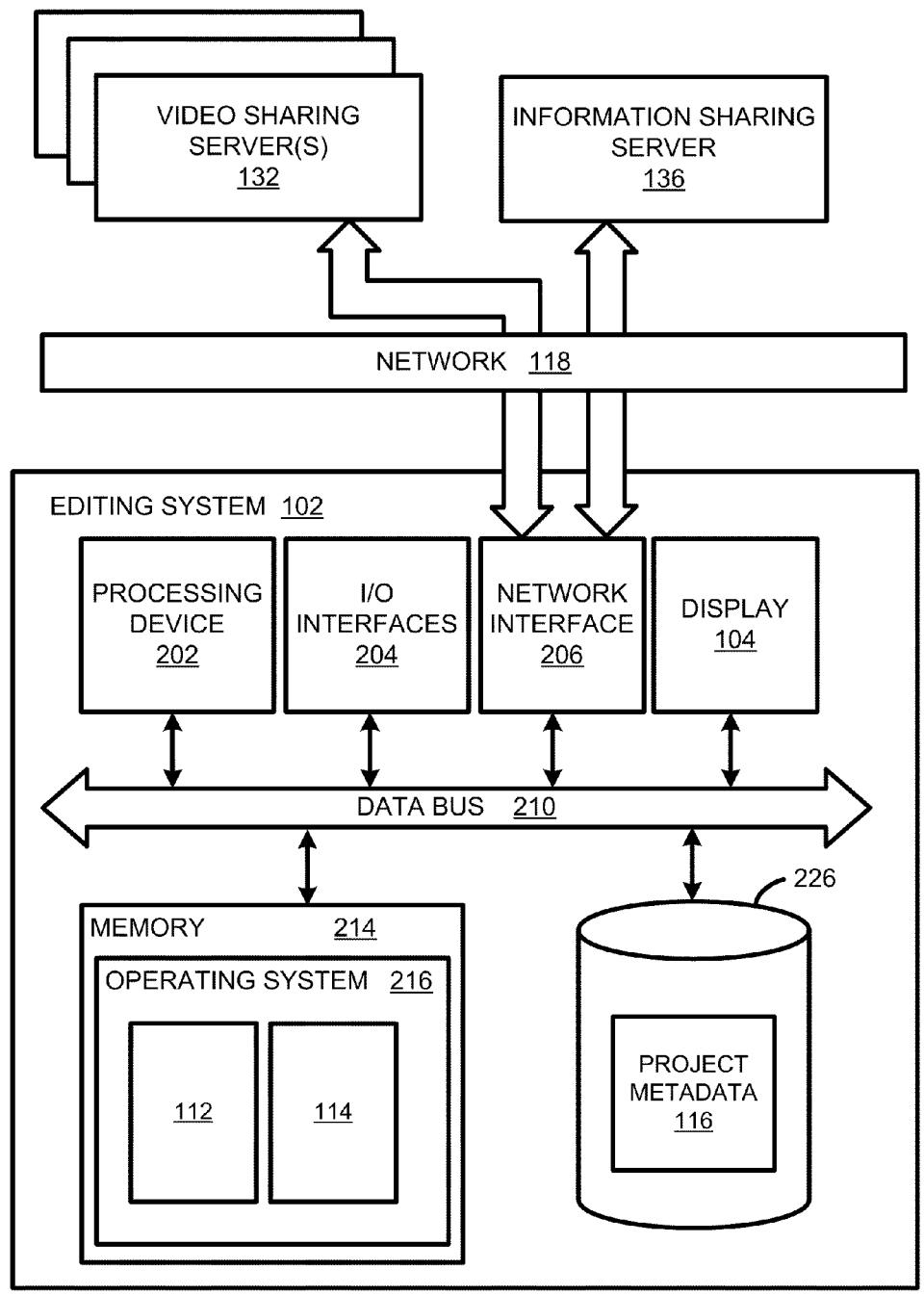
FIG. 2 illustrates an embodiment of the computing device shown in FIG. 1.

Reference is now made to FIG. 2, which illustrates an embodiment of the editing system 102 shown in FIG. 1. Generally speaking, the editing system 102 may comprise any one of a wide variety of wired and/or wireless computing devices, such as a desktop computer, portable computer, dedicated server computer, multiprocessor computing device, cellular telephone, personal digital assistant (PDA), handheld or pen based computer, embedded appliance and so forth. The editing system 102 may also comprise a video game console such as the popular Wii® platform by Nintendo and the Playstation 3® from Sony. Irrespective of its specific arrangement, editing system 102 can, for instance, comprise memory 214, a processing device 202, a number of input/output interfaces 204, a network interface 206, a display 104, and mass storage 226, wherein each of these devices are connected across a data bus 210.

The processing device 202 can include any custom made or commercially available processor, a central processing unit (CPU) or an auxiliary processor among several processors associated with the editing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software such as the playback application 112 and editing system 114 depicted in FIG. 1. One of ordinary skill in the art will appreciate that the memory 214 can, and typically will, comprise other components which have been omitted for purposes of brevity.

Input/output interfaces 204 provide interfaces for the input and output of data. For example, where the editing system 102 comprises a personal computer, these components may interface with user input device 204, which may be a keyboard or a mouse, as shown in FIG. 1. Where the editing system 102 comprises a gaming console, the input/output interfaces 204 may communicate with a video game controller such as, for example, the wireless Wii Remote® and Wii MotionPlus® from Nintendo or the DualShock® and wand-shaped motion controller from Sony. Using such controllers, a user can incorporate multimedia editing objects into a video through a series of motions. Display 104 can comprise, for example, a computer monitor, plasma television, or a liquid crystal display (LCD).

In the context of this disclosure, a "computer-readable medium" stores the program for use by or in connection with the instruction execution system, apparatus, or device. The computer readable medium can be, for example, but not limited to, an electronic, magnetic, optical, electromagnetic, infrared, or semiconductor system, apparatus, device, or transport medium. More specific examples (a non-exhaustive list) of the computer-readable medium may include by way of example and without limitation: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

With further reference to FIG. 2, network interface device 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). As shown in FIG. 2, the editing system 102 may communicate with the video sharing server 132 and the information sharing server 136 via the network interface 206 over the network 118. As noted earlier, the video sharing server 132 and the information sharing server 136 may be integrated into a single server for some embodiments. The editing system 102 may further comprise mass storage 226 which stores and manages such data as the project metadata 116 associated with a video editing project.

Figure 3:
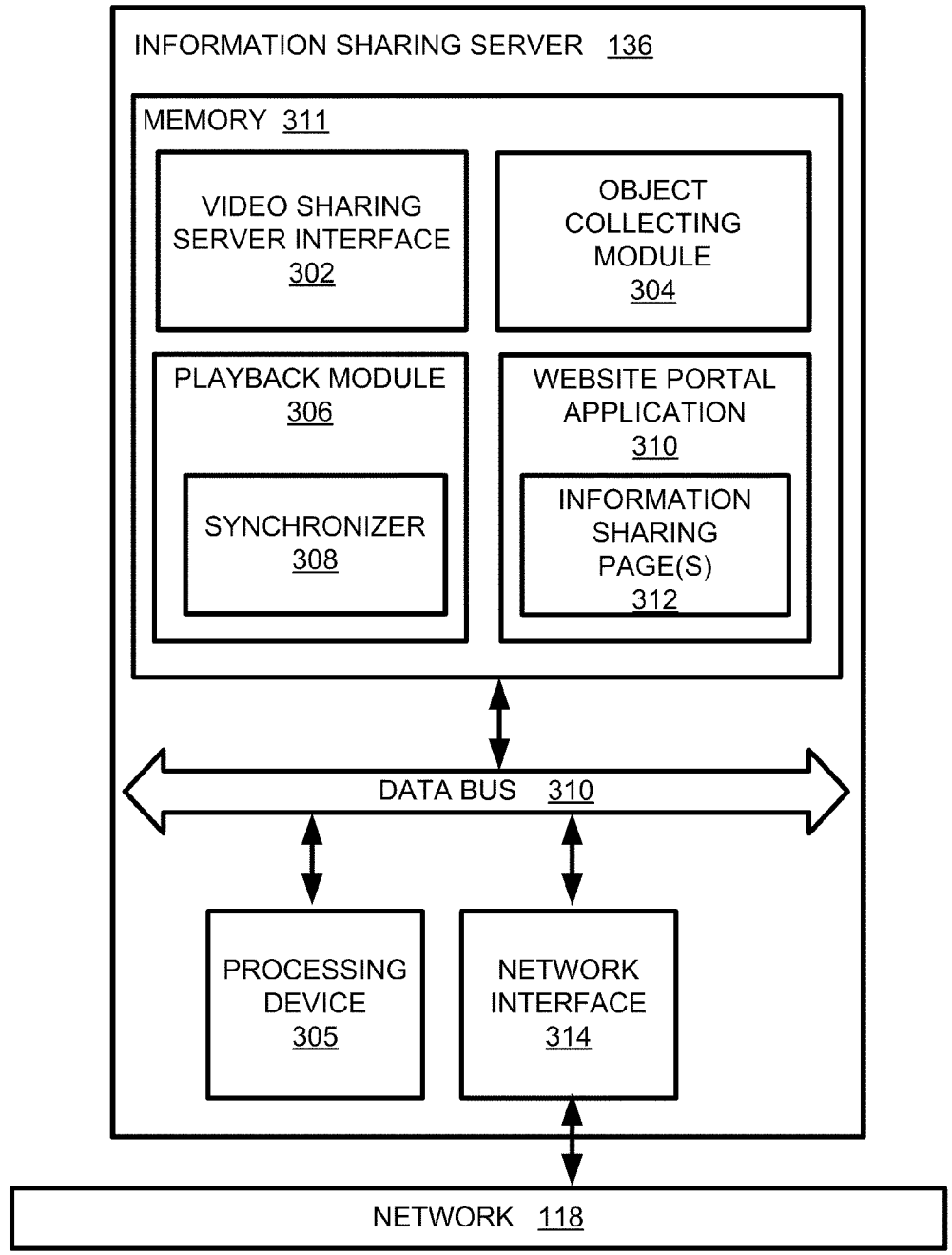
FIG. 3 illustrates an embodiment of the director forum server shown in FIG. 1.

Reference is made to FIG. 3, which illustrates an embodiment of the information sharing server 136 shown in FIG. 1. As with the editing system 102 described above for FIG. 1, the information sharing server 136 may comprise any one of a wide variety of computing devices, such as a desktop computer, portable computer, and so forth. The information sharing server 136 may be further embodied in a server-client configuration as known by one of ordinary skill in the art. The information sharing server 136 further comprises memory 311, a processing device 305, and a network interface 314, which allows the information sharing server 136 to communicate with external devices such as the editing system 102 and viewing system/client 103 in FIG. 1 via the network 118. Each of these components 311, 305, 314 may be connected across a data bus 310.

The memory 311 may comprise application specific software such as a video sharing server interface 302 that allows the information sharing server 136 to receive video and other content from the video sharing server 132 or other web portals. The memory 311 further comprises an object collecting module 304 configured to receive project metadata 116 stored in a project description file and determine which special effects, audio, and subtitles have been incorporated into a particular video. The playback module 306 receives the video from the video sharing server interface 302 and the multimedia editing objects such as special effects, audio, and subtitles from the object collecting module 304 and forwards the data to the synchronizer 308. The synchronizer 308 provides an output comprising the edited multimedia content synchronized with the multimedia editing objects such as special effects, audio, and subtitles. The information sharing server 136 further comprises a website portal application 310 stored in memory 311 which hosts and manages one or more information sharing web pages 312.

The information sharing web pages 312 are rendered on a display at the user end and provide a user such as one utilizing the viewing system/client 103 in FIG. 1 with a graphical user interface for uploading video editing project data. The website portal application 130 also receives the output generated by the synchronizer 308 and renders the output on one or more information sharing pages 312 for a user to view. As will be described later, a viewing system or client 103 receiving the output views the edited multimedia content in addition to various thumbnail graphics depicted in a timeline. The thumbnails signify the various special effects, audio, and subtitles and the associated timing that have been incorporated into the video. As described earlier, a computer-readable medium can be any medium that can contain, store, or maintain the various applications 302, 304, 306, 310, 312 described above for use by or in connection with an instruction execution system whereby a processor 305 executes the applications 302, 304, 306, 310, 312.

Figure 4A:
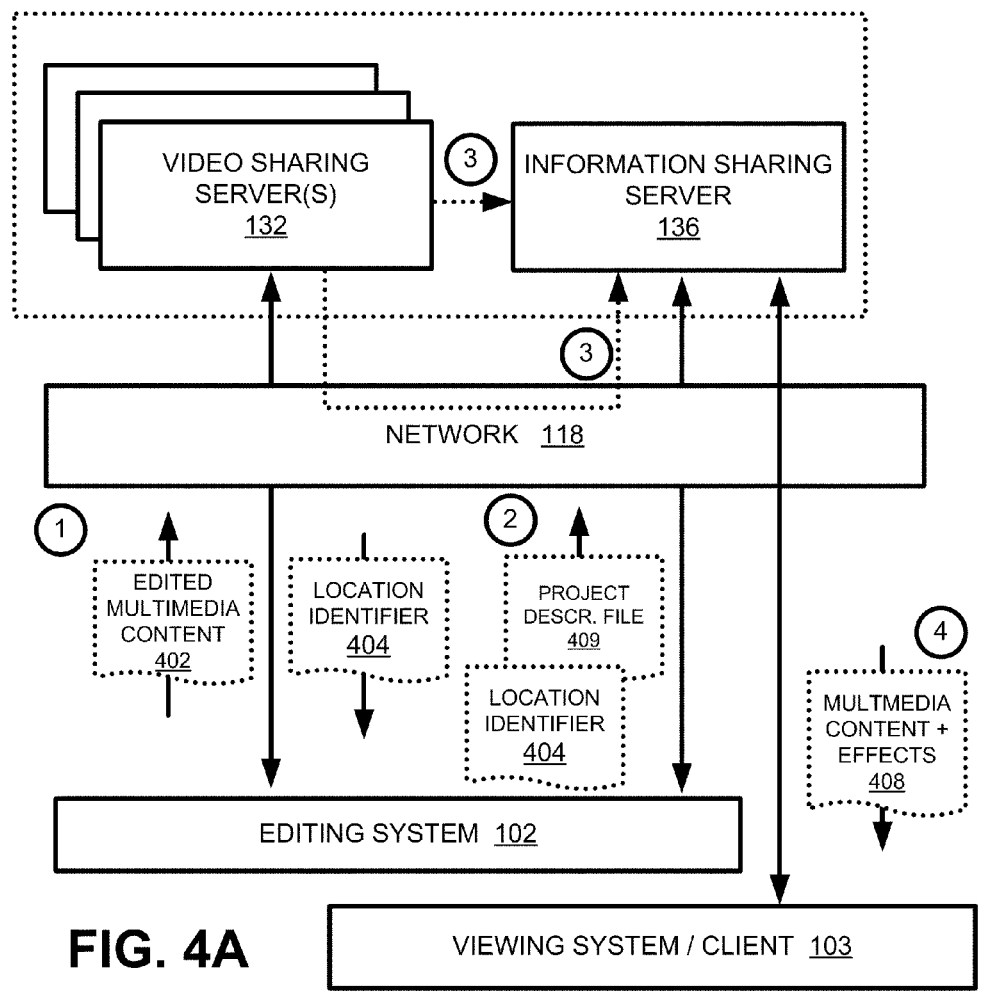
FIGS. 4A-B illustrate the general data flow between the video system, the one or more video sharing servers, and the director forum server shown in FIG. 1.

FIG. 4A illustrates the general data flow between the editing system 102, the one or more video sharing servers 132, and the information sharing server 136 shown in FIG. 1. As denoted by the dashed box, the video sharing server 132 and the information sharing server 136 may be integrated into a single server for some embodiments. For embodiments where one or more video sharing servers 132 and the information sharing server 136 are embodied on separate servers, the servers 132, 136 may communicate over the network 118. Alternatively, if the servers 132, 136 are embodied on a single server, the servers 132, 136 may communicate via an internal interface.

Figure 4B:
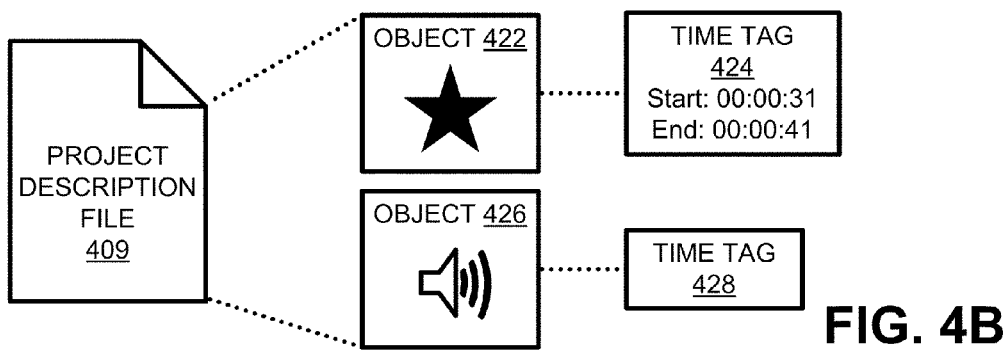

A user edits a video using an editing system 114 on the editing system 102 in FIG. 1, whereby project metadata 116 associated with the video editing process is generated, and the association of the project metadata 116 is stored in a project description file 409. The project description file 409 may be in the form of an extensible markup language (XML) file or written in other language. As shown in FIG. 4B, the project description file 409 may include a plurality of objects 422, 426, which may include, for example, thumbnails, effects, original video clips, audio, subtitle, etc. For some embodiments, the project description file 409 may thus comprise an XML file and thumbnail graphics. In other embodiments, however, the project description file 409 itself may be an XML file that describes information relating to the effects. For such embodiments, the thumbnail graphics are not included in the project description file 409. Each object 422, 426 comprises a corresponding timing data according to the edited multimedia content.

Upon editing the multimedia content, the user uploads the edited multimedia content 402 to one or more video sharing/content portal websites 130, where the edited multimedia content 402 may be stored online on the one or more video sharing servers 132. After uploading the edited multimedia content 402 and storing the edited multimedia content 402 online at the one or more video sharing servers 132, the editing system 102 may receive a location identifier from the one or more video sharing servers 132, which specifies where to retrieve the stored multimedia content 402. For some embodiments, the location identifier 404 may comprise a uniform resource locator (URL). The editing system 102 then uploads the project description file 409, the thumbnail graphics, and the location identifier 404 to the information sharing server 136.

Upon playback, the edited multimedia content 402 may be streamed from the video sharing server 132 and rendered as a web page by the information sharing server 136. Specifically, the web page may be rendered on a display and viewed by the client 103. When the client 103 elects to playback the edited multimedia content 402 and view how the special effects and/or templates were incorporated into the video, the information sharing server 136 accesses the edited multimedia content 402 using the location identifier 404, and the video sharing server 132 streams the edited multimedia content 402 to the information sharing server 136. In the non-limiting example described earlier, the video sharing website may be the popular YouTube website, where many individuals access personalized video content. In implementations where the edited multimedia content 402 is stored on YouTube, the information sharing server 136 interfaces with the YouTube server(s) using a YouTube application programming interface (API), whereby video content is played back on the information sharing web page to provide seamless playback. Thus, during playback of a selected multimedia content 402, the viewing system/client 103 receives both the edited multimedia content 402 and the special effects, audio, and subtitles 408 synchronized together. This allows the user at the viewing system 103 to precisely follow the editing process and techniques utilized by the first user 102 in editing the video.

Figure 5:
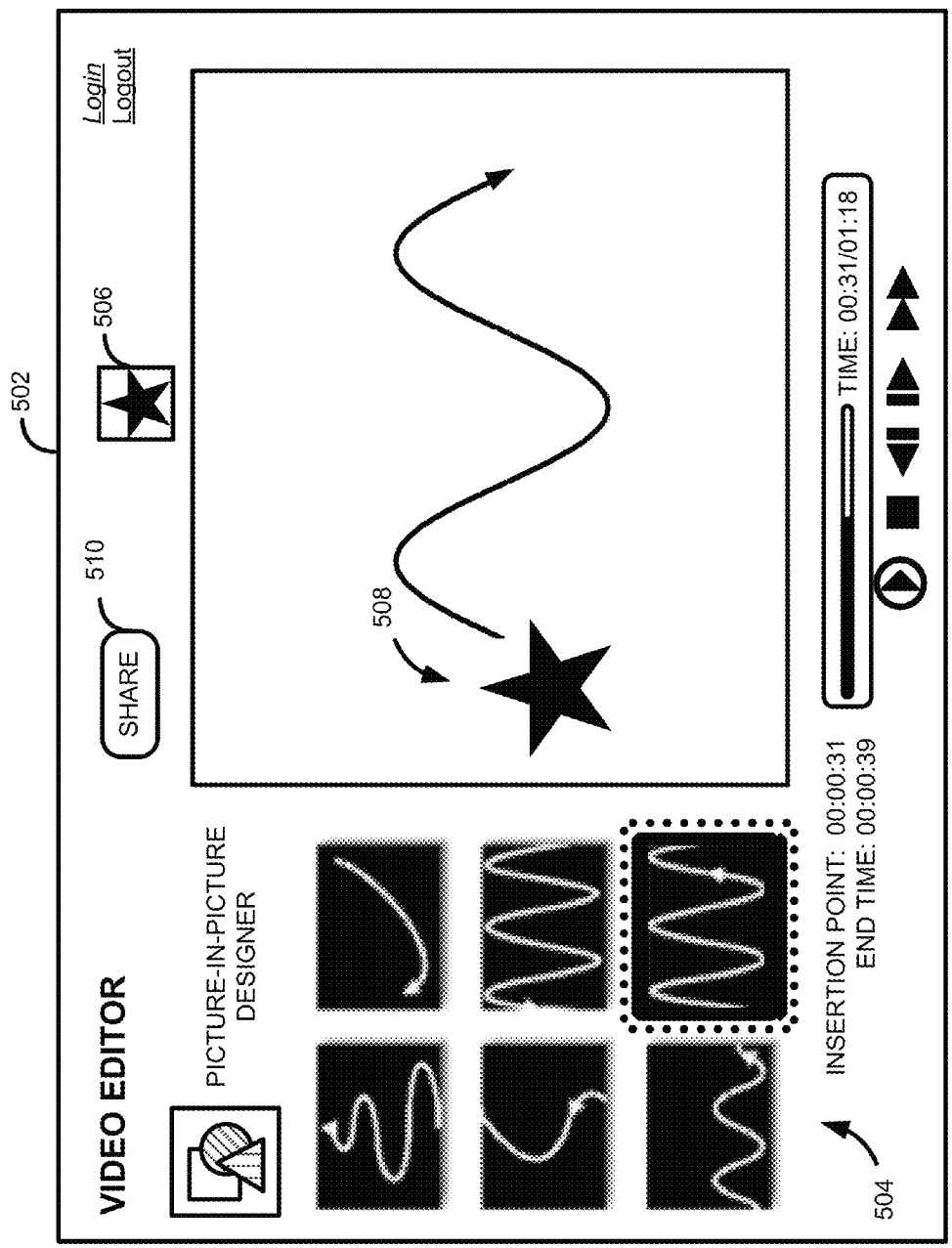
FIG. 5 is an example user interface of the editing system executed on the video system in FIG. 1.

FIG. 5 is an example user interface 502 of the editing system 114 executed on the editing system 102 in FIG. 1. In the non-limiting example shown, the user interface 502 comprises a picture-in-picture (PiP) designer whereby a user can incorporate graphics into an existing video. In the example shown, the user interface 502 allows a user to control the motion of the graphic 508 (a star in this example). The user selects one of the pre-defined templates 504, which specifies the motion of the star 508 on the display. The PiP designer is just one of various interfaces that may be used to incorporate special effects into a video. Picture-in-picture effects may comprise static objects and moving objects. Other multimedia editing objects, may include by way of example and without limitation: customized text, customized subtitles, embedded video, embedded audio, and transition effects. A user may also decide to utilize predefined templates for editing multimedia content. Such templates may comprise "title" templates and "particle" templates. Title templates generally involve the insertion of a special frame in the display, where the special frame may coincide with a particular theme (e.g., birthday theme, wedding theme). Particle templates generally comprise predefined moving objects. Such templates may include, for example, falling snow flakes, a fire effect, or smoke effect. Other special effects include rotation of objects, blurred effects, color-modification, mosaics, and so on.

As part of the editing process, the user specifies the timing of the special effect. For example, the star 508 shown in FIG. 5 may be displayed starting at time 00:00:31, at which time, the star appears and moves in the manner shown. While the video is being edited, the special effect (i.e., star PiP effect) and the associated timing (e.g., 00:00:31 to 00:00:39) is captured in project metadata 116, which is later uploaded to the information sharing website 134 to be stored on the information sharing server 136. Furthermore, thumbnail graphics such as the one 506 shown in FIG. 5 are created that represent the various special effects being incorporated into the video. In accordance with some embodiments, the thumbnails 506 may be defined by the user by specifying, for example, a bitmap file or other graphic file. Alternatively, the thumbnails 506 may comprise a snapshot of the particular frame in which the multimedia editing object is first introduced into the edited multimedia content 402. The thumbnails 506 are also captured in the project description file 409. As described earlier, for some implementations, project metadata 116 may be stored in a project description file 409, whereby timing data of the multimedia editing content or special effects are specified. The project description file may be in the form of an extensible markup language (XML) file, which allows a user to share information between the editing system 102 and the information sharing server 136.

The user interface 502 further comprises a "SHARE" button 510 which allows a user to upload the edited multimedia content 402 and associated project metadata 116 to the information sharing website 134 to be shared among a community of users that access the website 134. It should be noted that that the user interface 502 may further comprise different buttons to separately upload edited multimedia content and project metadata. The user interface 502 may also be used to share an individual template (i.e., special effect) to the information sharing website 134 by clicking the "SHARE" button 510 or other button.

In some embodiments, the user may login to an existing account maintained by the information sharing server 136. The information sharing server 136 provides online storage of the project metadata 116 captured in a project description file 409 without the need for storing the edited multimedia content itself 402, thereby saving considerable storage space. As described above, the edited multimedia content 402 is stored at the video sharing server 132. For some embodiments, however, the video sharing server 132 and the information sharing server 136 may be integrated into a single server, so that the edited multimedia content 402 is stored in the integrated server.

Figure 6:
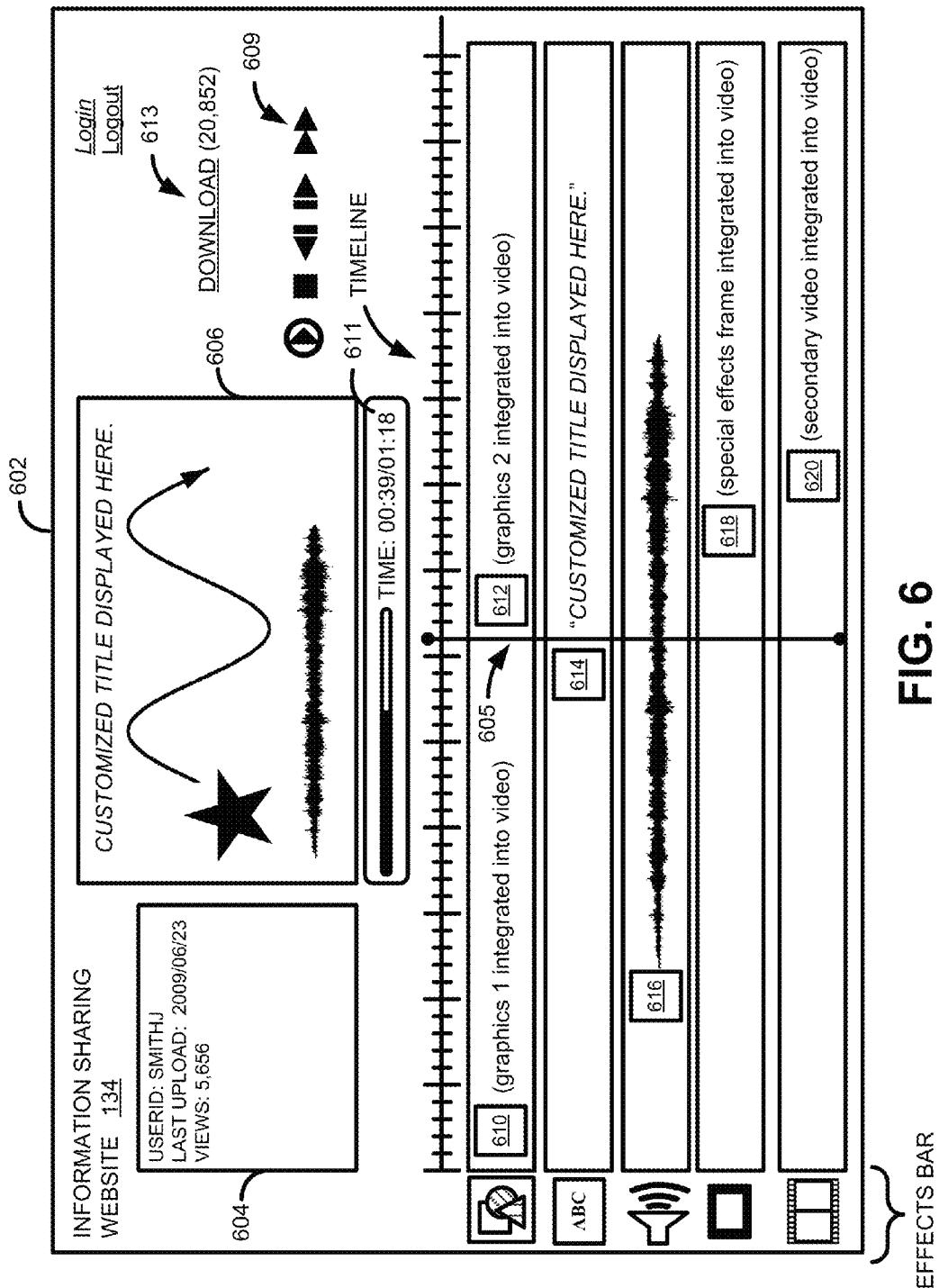
FIGS. 6-8 illustrate an example user interface executed on an information sharing server through which a user may view the edited video in addition to special effects incorporated into the video.

FIG. 6 is an example user interface 602 through which a user may view the edited multimedia content 402 in addition to multimedia editing objects or special effects incorporated into the video. As described earlier, the user may utilize the viewing system 103 in FIG. 1 to access the information sharing website 134 to select a particular author's work to view and follow the video editing techniques used or designed by the author. To facilitate this, various embodiments provide both playback of the edited multimedia content 402 in addition to illustration of the multimedia editing objects incorporated into the video. The illustration of the multimedia editing objects may involve displaying both thumbnails 610, 612, 614, 616, 618, 620 and the depiction of multimedia editing objects (e.g., added graphics, added effects, customized audio, customized subtitles, etc.). Information 604 such as user ID, description of author or content, relating to the author of the edited multimedia content 402 is shown. In addition to the user ID, the information 604 further comprises the date of the last upload and the number of views and ratings or related statistics. One should note that other features not shown may also be included. For example, the user interface 602 may include ratings and other statistics relating to the author of the edited content.

Figure 7:
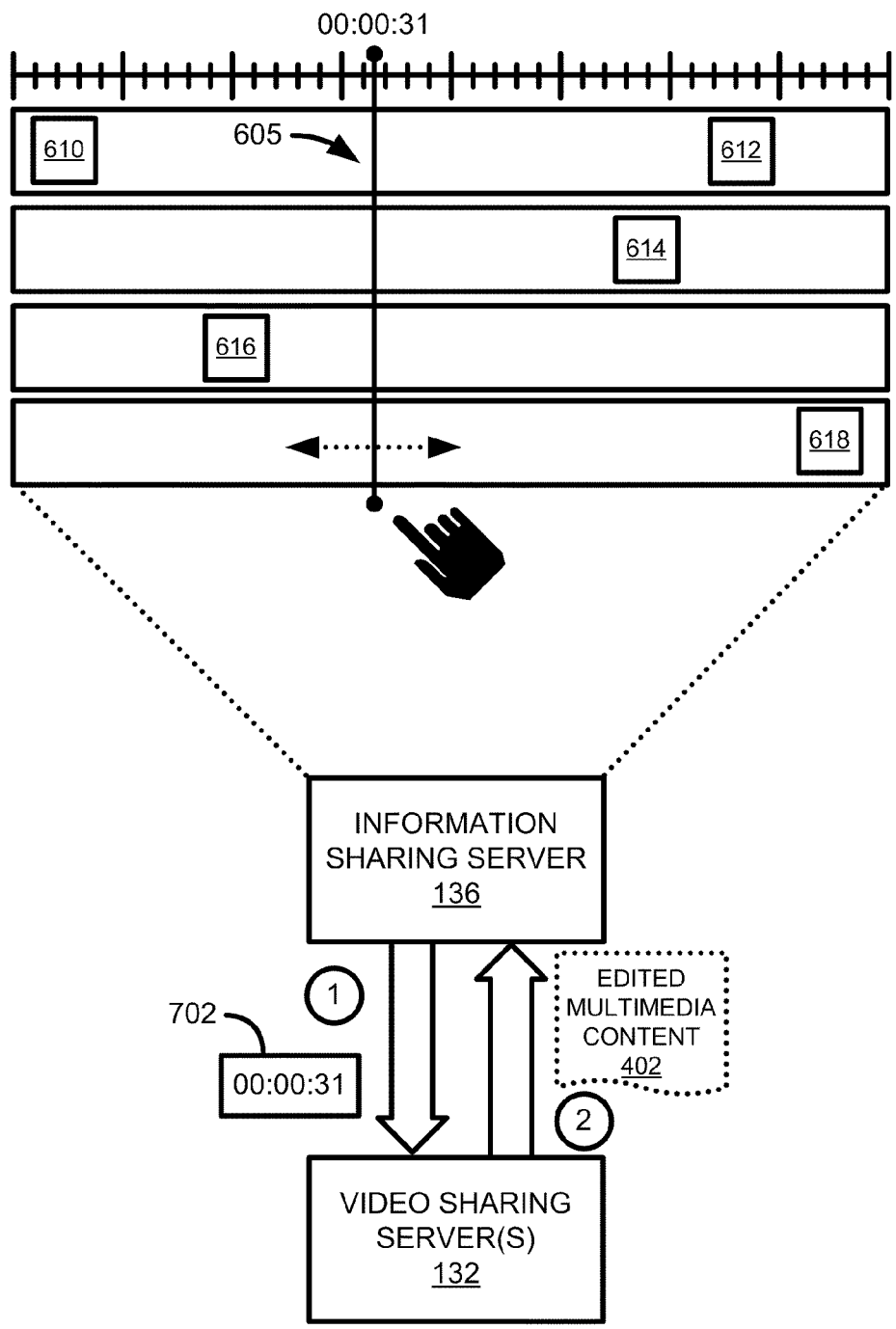

The user interface 602 further comprises a main display 606 in which the edited multimedia content 402 is played back in addition to a plurality of navigation control buttons 609 for the user to control playback, fast forward, fast backward, pause, and stop functions relating to the edited multimedia content 402. A user may click navigation control buttons 609 to view the edited multimedia content 402 or click the timing bar 611 at a particular time. A progression bar (e.g., a vertical bar) 605 on the effects bar of the user interface 602 moves according to movement of the timing bar 611 by the user and jumps to a particular time. For some implementations, a user may drag the progression bar 605 to control playback of the edited multimedia content 402, as depicted in FIG. 7. The information sharing server 136 sends timing data based on movement of the progression bar 605 to the video sharing server 132 to request streaming of the edited multimedia content 402 according to timing data 702 specified by movement of the progression bar 605. This gives the user full control in viewing the edited multimedia content 402 in conjunction with the special effects.

By way of illustration, suppose the user drags the progression bar 605 to time 00:00:31. For some embodiments, the information sharing server 136 sends this information 702 to the video sharing server 132. In response, the video sharing server 132 transmits the edited multimedia content 402, which is received at the information sharing server 136 to be displayed on the user interface hosted by the information sharing server 136. The edited multimedia content 402 is then displayed, beginning at time 00:00:31. The user interface may be rendered on the display at a client 103. For some implementations, the information sharing server 136 may receive the edited multimedia content 402 from the video sharing server 132 via streaming transmission. While the user drags the progression bar 605, the edited multimedia content 402 and the special effects are synchronized according to the associated timing specified in the project description file. As described earlier, the information sharing server 136 and the video sharing server 132 may be integrated into a single server for some implementations. For such implementations, communication between the two server modules 132, 136 may be performed via an internal interface. In this regard, displaying the time of the edited multimedia content 402 is synchronized with the location of the progression bar 605.

In an alternative embodiment, a user may control playback of the edited multimedia content 402 via navigation controls comprising the timing bar (i.e., seek bar) 611 and/or control buttons 609. For some embodiments, the navigation controls may be similar to those normally displayed by the video sharing server 132 when users wish to view multimedia content. The information sharing server 136 generates a user interface that embeds a user interface similar to one normally provided by the video sharing server 132 in order to provide seamless playback. As an illustration, the navigation controls displayed when users access the YouTube website may be embedded into the user interface hosted by the information sharing server 136. The embedded user interface includes the navigation controls 609, 611. Thus, when a user utilizes the navigation controls 609, 611 to control playback, playback instructions are executed by the video sharing server 132 rather than by the information sharing server 136. For such embodiments, the marker/progression bar 605 is synchronized with the timing bar 611 in order to show which special effect or video editing object is applied to the edited multimedia content at a particular point in time.

Figure 8:
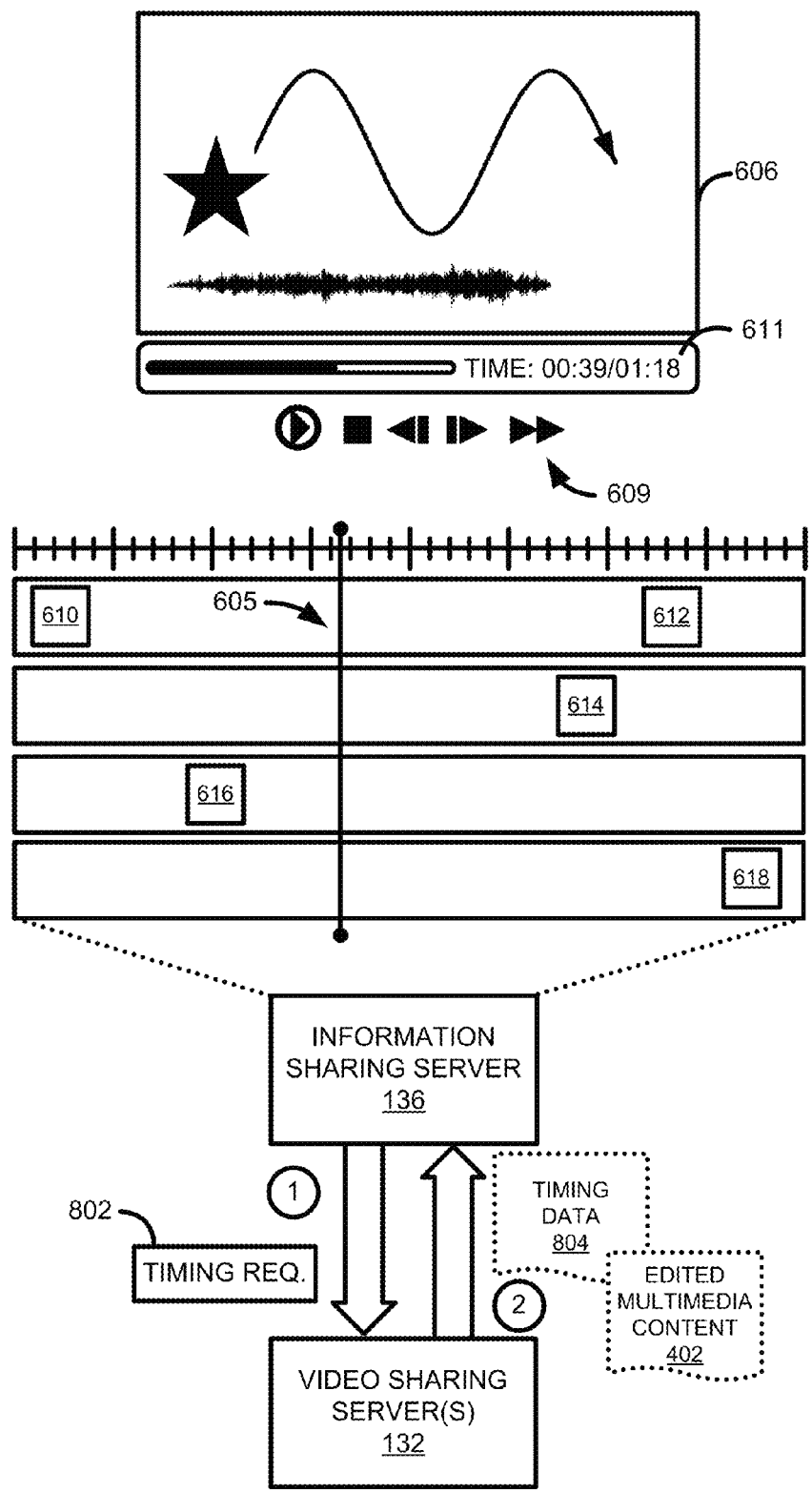

Reference is made to FIG. 8. During playback of the edited video received from the video sharing server 132, the information sharing server 136 sends a timing request 802 to the video sharing server 132 to determine the current playback time. Based on timing data 804 received from the video sharing server 132, the information sharing server 136 updates the progression bar 605 in the user interface 602 according to the received timing data from the video sharing server 132. As one of ordinary skill will appreciate, there are different means for controlling playback of the edited multimedia content 402.

The effects bar shown in the user interface 602 comprises the various multimedia editing objects. The effects bar provides an index of the special effects, audio, subtitles, etc. used by the creator of the video. Shown also are various thumbnails 610, 612, 614, 616, 618, 620 that represent the various multimedia editing objects which are used by the author to create the edited multimedia content 402. As described earlier, the thumbnails 610, 612, 614, 616, 618, 620 may comprise customized graphics selected by the user during editing of multimedia content by using an editing system. In some embodiments, the thumbnails 610, 612, 614, 616, 618, 620 may also be automatically generated whereby a snapshot of the frame within the video 402 is stored as the thumbnail 610, 612, 614, 616, 618, 620. The user interface 602 contained in the information sharing website 134 also comprises a timeline and a marker or a progression bar 605 which shows the progression of the edited multimedia content 402 during playback. The placement of each of the thumbnails 610, 612, 614, 616, 618, 620 corresponds with the associated timing data specified in the project description file 409. The timing data or timing datas 424, 428 stored in the project description file 409 specify the start time and end time of each of the multimedia editing objects.

For some implementations, the thumbnails 610, 612, 614, 616, 618, 620 appear only as the progression bar 605 passes. In other implementations, the thumbnails 610, 612, 614, 616, 618, 620 are highlighted as the progression bar 605 passes. The user may also select one of the thumbnails 610, 612, 614, 616, 618, 620 to highlight a multimedia editing object which the user is interested in. When the user clicks on the thumbnail 610, 612, 614, 616, 618, 620, the edited multimedia content is synchronized on the main display to a point in time corresponding to the timing data of the selected thumbnail 610, 612, 614, 616, 618, 620. The user viewing the editing process may further control playback of the edited multimedia content by controlling the progression bar 605 or by using the navigation controls 609 shown.

The timing data of the one or more multimedia editing objects may be monitored by viewing or controlling the timing bar 611 shown. One should note that the timing bar 611 associated with video playback is synchronized with the display or highlighting of thumbnails 610, 612, 614, 616, 618, 620 as the corresponding special effect (e.g., customized text) is incorporated into the video. As described earlier, the user may drag the progression bar 605 to jump to another point in time along the timeline. While the user is dragging the progression bar 605, the edited multimedia content 402 is synchronized and displayed on the user interface 602 according to location of the progression bar 605. In this regard, the viewer can fully appreciate the timing and editing techniques used by the creator (e.g., "SmithJ") without the need for first investing in editing system software. For some embodiments, the user can also download the special effects by clicking a link 613. For other embodiments, the user can download the special effects by clicking the thumbnails 610, 612, 614, 616, 618, 620. The user will then be directed to another website to download the desired special effects. Depending on the implementation, this may involve the user downloading the previously uploaded project metadata 116. Upon downloading the project metadata 116, the user may utilize an editing system 114 compatible with the project metadata 116 and utilize the project metadata 116 as a template. To help a user navigate through the one or more information sharing websites 134 hosted on the information sharing server 136, the information sharing websites 134 may provide another user interface (not shown) whereby a user can choose to view edited multimedia content 402 that are categorized according to the special effects (e.g., static objects, motion objects, frames) contained in the edited multimedia content 402. If a user clicks on the "Motion Objects" tab, for instance, a list of edited multimedia content 402 containing moving graphics will be displayed. The user can then select specific multimedia content 402 to view.

Figure 9:
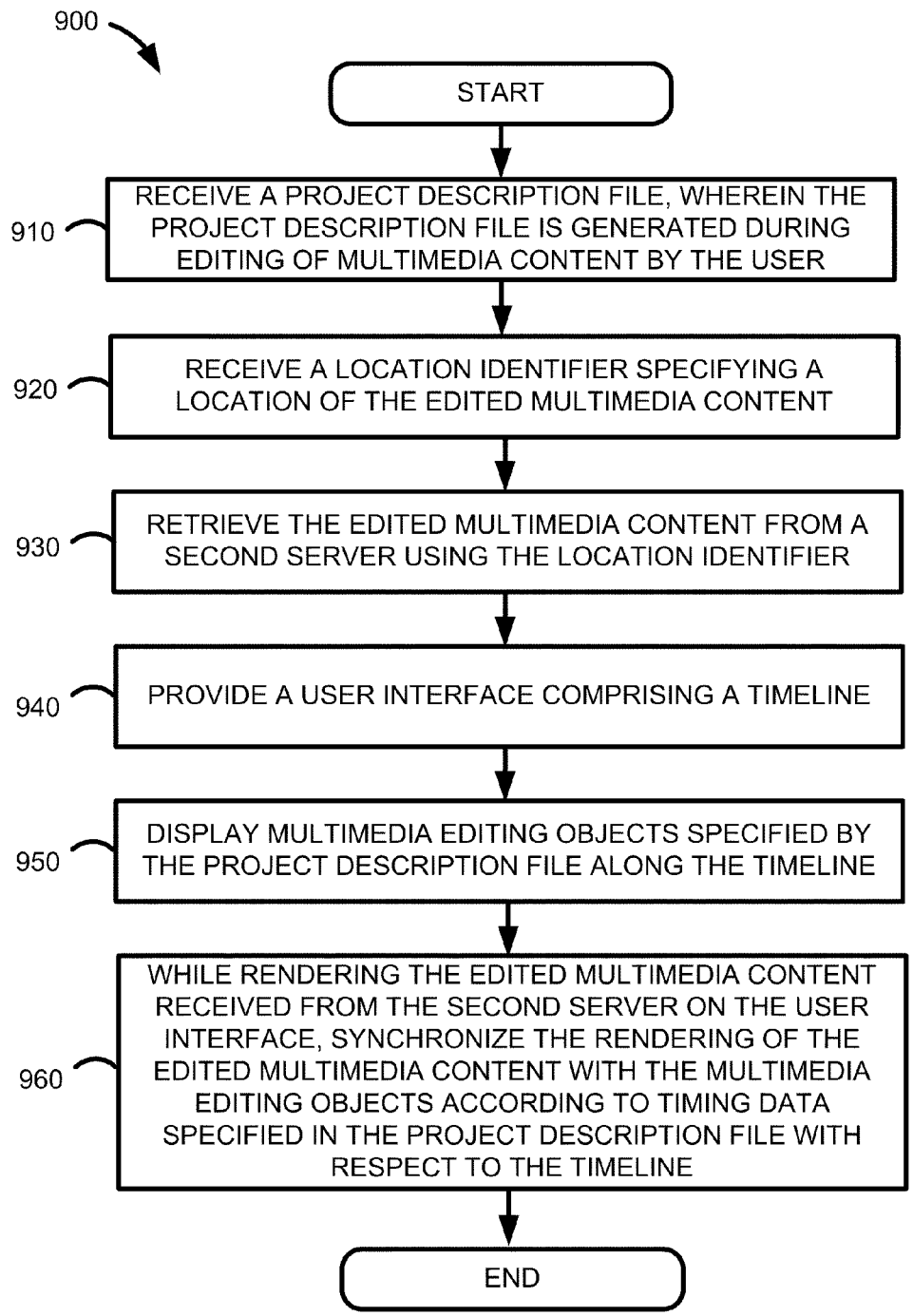
FIG. 9 is a flowchart of an embodiment for sharing multimedia editing techniques implemented in the system of FIG. 1.

FIG. 9 is a flowchart of an embodiment for sharing multimedia editing techniques implemented in the system of FIG. 1. It should be noted that if embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system such as the ones shown in FIG. 1. The machine code may be converted from the source code, etc. If embodied in hardware, each block may represent a circuit or a number of interconnected circuits to implement the specified logical function(s).

Although the flowchart 900 of FIG. 9 shows a specific order of execution, it is understood that the order of execution may differ from that which is depicted. In the embodiment described below, a method is performed at a first server for sharing video editing techniques by a user. In block 910, a project description file is received. The project description file is generated during editing of multimedia content by the user and contains information relating to the edited multimedia content. In block 920, a location identifier specifying a location of the edited multimedia content is received. For some embodiments, the location identifier may comprise a uniform resource locator (URL). In block 930, the edited multimedia content is received from a second server using the location identifier. A user interface comprising a timeline is provided in block 940. In block 950, multimedia editing objects specified by the project description file are display along the timeline. While rendering the edited multimedia content received from the second server on the user interface, the rendering of the edited multimedia content is synchronized with the multimedia editing objects according to timing data specified in the project description file with respect to the timeline (block 960). Note that for some embodiments, the steps described above may be performed in real time where individuals are able to view video editing objects being incorporated into a multimedia file in real-time or near real-time. For such embodiments, the real time editing may be performed by incorporating Internet based interactive functionality into the editing system 102 of FIG. 1. For other embodiments, such real time editing may be incorporated into the Blu-ray (BD) Live platform. Using the real-time feature, users may take part in peer-to-peer interactions.

Figure 10:
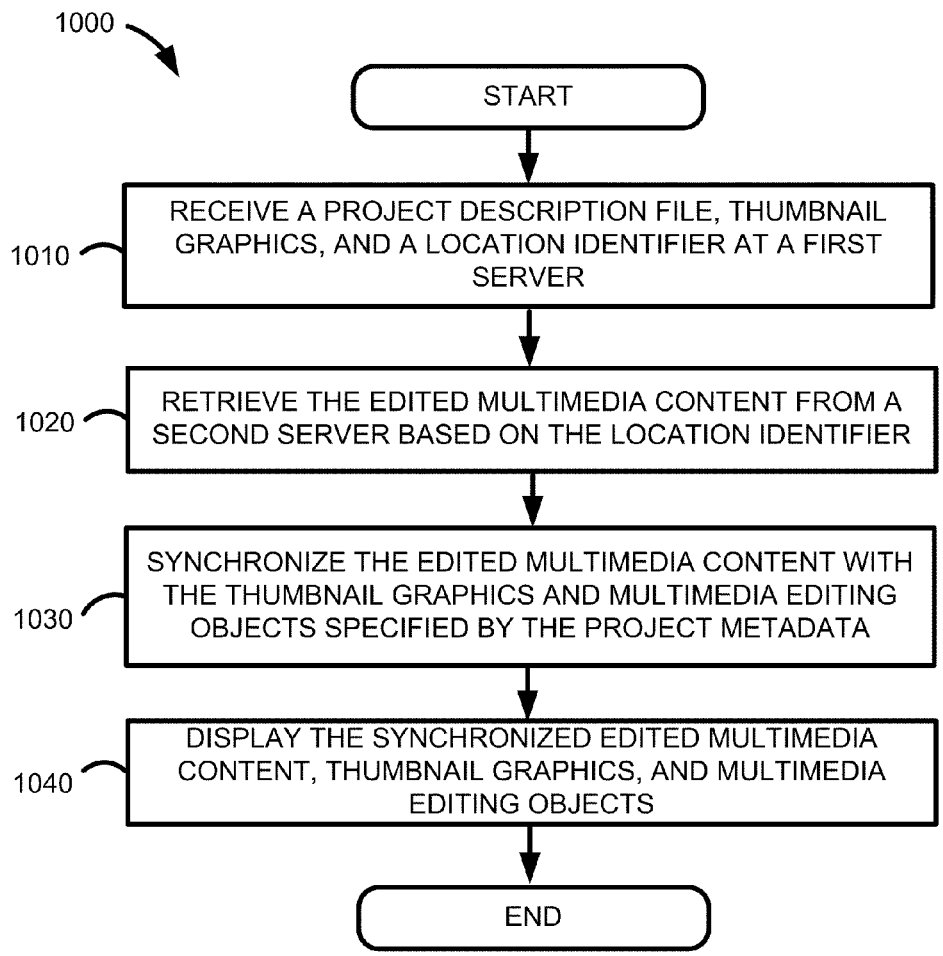
FIG. 10 is a flowchart of an alternative embodiment for sharing multimedia editing techniques implemented in the system of FIG. 1.

FIG. 10 is a flowchart 1000 of an alternative embodiment for sharing multimedia editing techniques implemented in the system of FIG. 1. Again, it should be emphasized that if embodied in software, each block described below may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system such as the ones shown in FIG. 1.

Beginning with block 1010, the method comprises receiving a project description file, thumbnail graphics, and a location identifier at a first server. Again, for some embodiments, the location identifier may comprise a URL. The project description file is generated during editing of multimedia content by the user. Furthermore, the thumbnail graphics represent multimedia editing objects incorporated into the edited multimedia content. In block 1020, the edited multimedia content is retrieved from a second server based on the location identifier. In block 1030, the edited multimedia content is synchronized with the thumbnail graphics and multimedia editing objects specified by the project metadata. In block 1040, the synchronized edited multimedia content, thumbnail graphics, and multimedia editing objects are displayed.

In accordance with alternative embodiments, viewers can reuse the timeline-based template generated by an editing system 102 (FIG. 1) and uploaded by a first user. In some cases, the editing of a video based on an earlier project can be difficult to mimic, even if the viewer is able to see the creation of the edited video through the timeline implementations described earlier (e.g., FIG. 6). Thus, alternative embodiments allow viewers to download a timeline-based template, which contains layout information and timing information and populate the template with their own content. As with the other embodiments described earlier, the timing data of the one or more multimedia editing objects may be monitored by viewing or controlling a timing bar, as will be described in more detail below. As will be described in more detail below, various embodiments are directed to a method performed at a server for sharing video editing techniques. The method comprises receiving, by the server, a project description file generated at a first editing system, the project description file containing information relating to special effect objects applied to multimedia content by the first editing system and providing, by the server, a timeline-based template derived from the project description file to a second editing system, wherein the timeline-based template comprises a timeline and object type designators corresponding to the special effect objects specified by the first editing system, wherein representations of the object type designators are displayed along the timeline. In accordance with some embodiments, the server receives, from the second editing system, a second multimedia content with special effect objects applied using the timeline-based template.

Figure 11A:
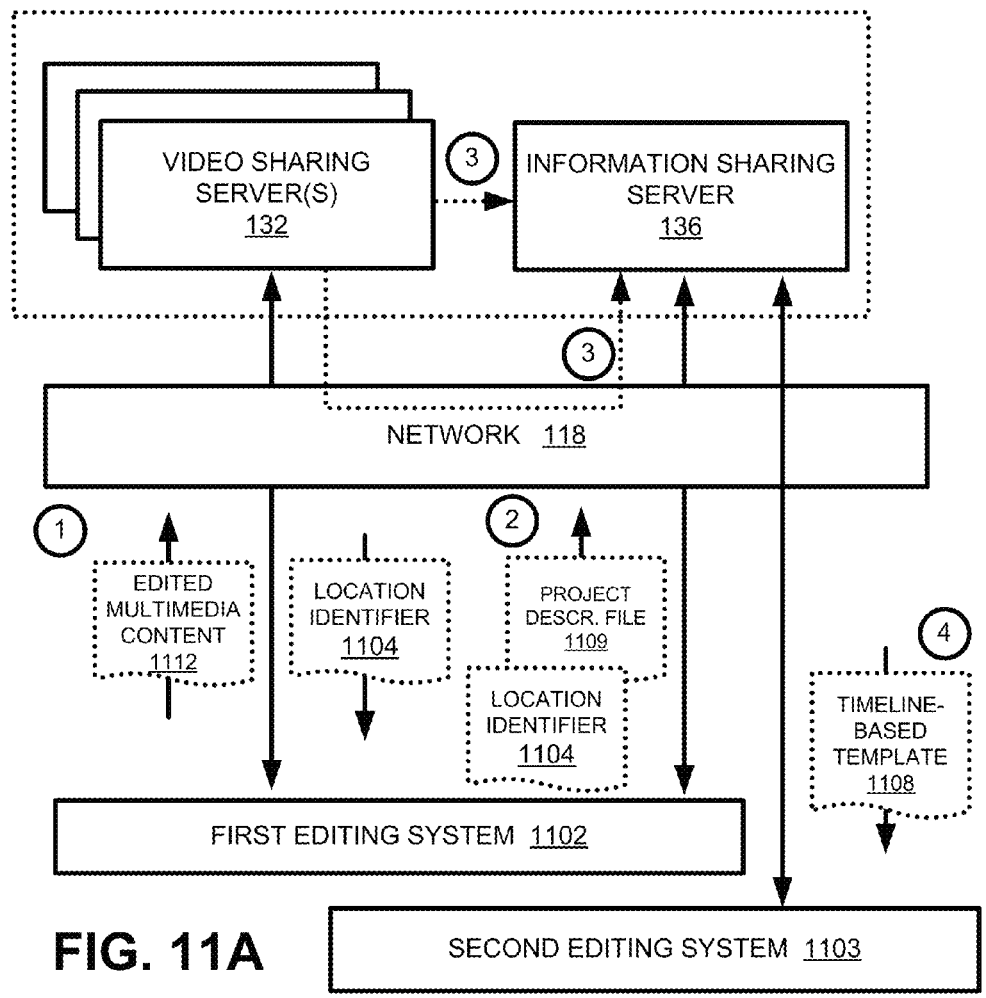
FIG. 11A illustrates the general data flow between a first editing system, the one or more video sharing servers, the information sharing server, and a second editing system.

Reference is made to FIG. 11A, which illustrates the general data flow between a first editing system 1102, the one or more video sharing servers 132, the information sharing server 136, and a second editing system 1103. As denoted by the dashed box, the video sharing server 132 and the information sharing server 136 may be integrated into a single server for some embodiments. For embodiments where one or more video sharing servers 132 and the information sharing server 136 are embodied on separate servers, the servers 132, 136 may communicate over the network 118. Alternatively, if the servers 132, 136 are embodied on a single server, the servers 132, 136 may communicate via an internal interface.

Figure 11B:
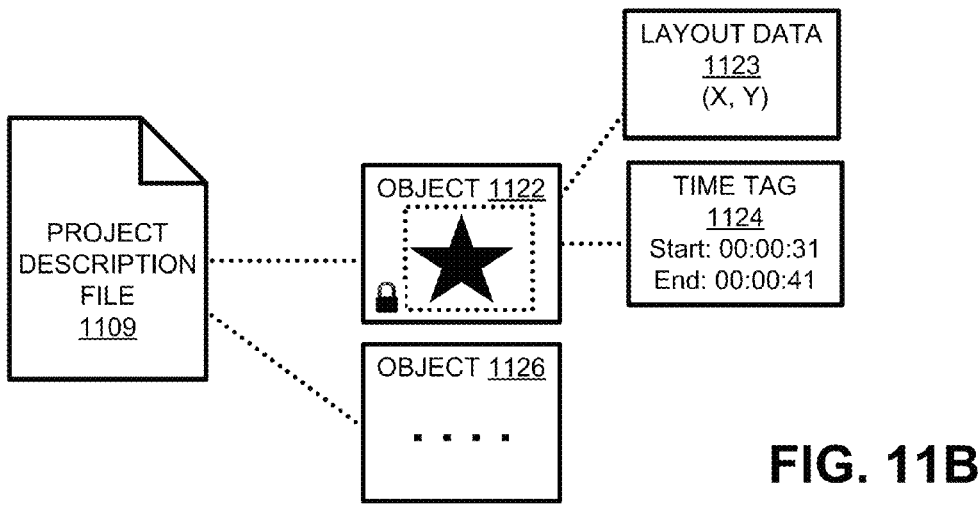
FIG. 11B illustrates an example of the project description file in FIG. 11A.

As shown, a user edits multimedia content using the first editing system 1102, whereby project metadata associated with the video editing process is generated, and the association of the project metadata is stored in a project description file 1109. The project description file 1109 may be in the form of an extensible markup language (XML) file or written in other language. Referring briefly to FIG. 11B, the project description file 109 may include a plurality of objects 1122, 1126, which may include, for example, graphics, video clips, audio clips, subtitles, etc. Note, however, that for alternative embodiments, the actual effects associated with the objects 1122, 1126 are not included or are locked by the author to limit access by viewers as the primary focus is to allow viewers to substitute their own effects (graphics, audio tracks, etc.) in place of the effects incorporated earlier by the author using the editing system 114. For some embodiments, the project description file 1109 may comprise an XML file and object designators which specify an object type (e.g., graphics versus audio). In other embodiments, the project description file 1109 itself may be an XML file that describes information relating to the effects. Each object 1122, 1126 comprises a corresponding timing data based on the edited multimedia content such as the timing data 1124 depicted for object 1122.

Referring back to FIG. 11A, upon editing the multimedia content, the author uploads the edited multimedia content 1112 from the editing system 102 to one or more video sharing/content portal websites 130, where the edited multimedia content 402 may be stored online on the one or more video sharing servers 132. After uploading the edited multimedia content 402 and storing the edited multimedia content 402 online at the one or more video sharing servers 132, the editing system 102 may receive a location identifier from the one or more video sharing servers 132, which specifies where to retrieve the stored edited multimedia content 1112. For some embodiments, the location identifier may comprise a uniform resource locator (URL). The editing system 102 then uploads the project description file 1109 to the information sharing server 136. As described earlier, for some embodiments, object type designators rather than actual effects are uploaded, thereby providing a viewer with a blank template. Alternatively, the actual special effects objects may be uploaded but locked by the author, as illustrated in FIG. 11B.

Note that if an author grants permission to do so, viewers at the second editing system 1103 can elect to playback the edited multimedia content 1112 uploaded by author via the second editing system 1103 and view how the special effects and/or templates were incorporated into the video. This allows the viewer to preview a template before downloading and utilizing the template. If the author allows viewers to view the author's editing multimedia content 1112, the edited multimedia content 1112 may be streamed from the video sharing server 132 and rendered as a web page by the information sharing server 136. Specifically, the web page may be rendered on a display and viewed at the second editing system 1103. A viewer at the second editing system 1103 may then elect to download the timeline-based template 1108, which contains such information as layout information, timing information, and object type designators and/or special effects objects (e.g., graphics, audio tracks, and video tracks). The timeline-based template 1108 provides the viewer at the second editing system 1103 with an opportunity to populate the template with the viewer's own content without having to re-create the entire production.

Figure 12A:
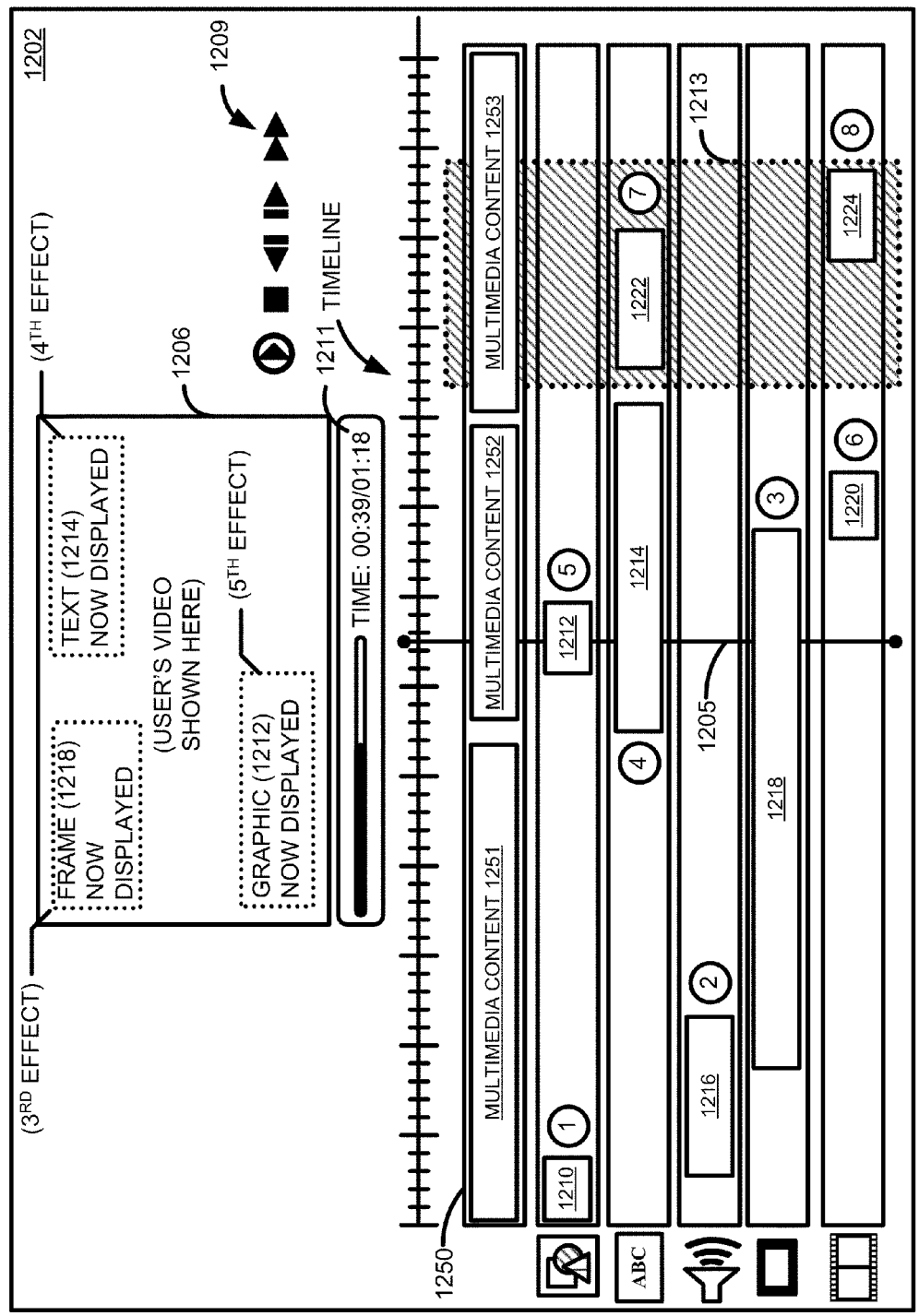
FIG. 12A illustrates an embodiment whereby a timeline-based template has been downloaded from the information sharing server for the viewer to insert new content using the second editing system.

Reference is made to FIG. 12A, which illustrates an embodiment whereby a timeline-based template has been downloaded from the information sharing server 136 for the viewer to insert new content using the second editing system 1103. As described earlier, the timeline-based template contains layout and timing information, which were specified by a first user (i.e., author) at the first editing system 1102. The user interface 1202 shown in FIG. 12A is similar to the user interface 602 described earlier in connection with FIG. 6. However, rather than viewing the author's content, a viewer utilizes the user interface 1202 to view and populate a blank template in order to mimic a previous author's work by incorporating the same video editing techniques designed earlier by the previous author. To facilitate this, the timeline-based template comprises the user interface 1202 shown in FIG. 12A displays messages corresponding to the various special effects. The user interface 1202 includes an effects bar, which include various effects, including, but not limited to, graphics, text, audio tracks, frames, and video tracks. The user interface 1202 further comprises representations of the various object type designators. The representations may comprise, for example, thumbnails 1210, 1212, 1214, 1216, 1218, 1220, 1222, 1224 such as those illustrated in the example of FIG. 12A.

The user interface 1202 comprises a main display 1206, which displays messages corresponding to special effects based on uploaded object designators. The user interface 1202 further comprises a plurality of navigation control buttons 1209 for the user to control playback, fast forward, fast backward, pause, and stop functions relating to the blank template. A user may click navigation control buttons 1209 to view the timeline-based template or click the timing bar 1211 at a particular time. A progression bar 1205 on the effects bar of the user interface 1202 moves according to movement of the timing bar 1211 by the user and jumps to a particular time. For some implementations, a user may drag the progression bar 1205 to control playback. In the example of FIG. 12A, the blank template includes eight effects—two sets of embedded graphics 1210, 1212, two sets of text 1214, 1222, audio content 1216, a frame 1218, and two sets of video content 1220, 1224. These effects are shown according to when they were inserted in the timeline by the previous author. As shown in the illustration of FIG. 12A, the length (time duration) of each effect can vary.

In the display window 1206, the viewer sees various messages corresponding to the placement and timing of each effect. For example, the fourth effect in the template comprises text 1214. Upon reaching that object type during playback, the display window 1206 displays a message that a text message is now being displayed. The message may comprise a generic message comprising, for example, "TEXT NOW DISPLAYED." The duration of the message corresponds to the length of the corresponding text object 1214. Similarly, placement and layout of the object corresponds to the placement and layout of the effect specified by the previous author. For example, the previous author may have inserted a text message at the upper right corner of the display. The message corresponding to the text object will thus be shown in the same approximate location.

Figure 12B:
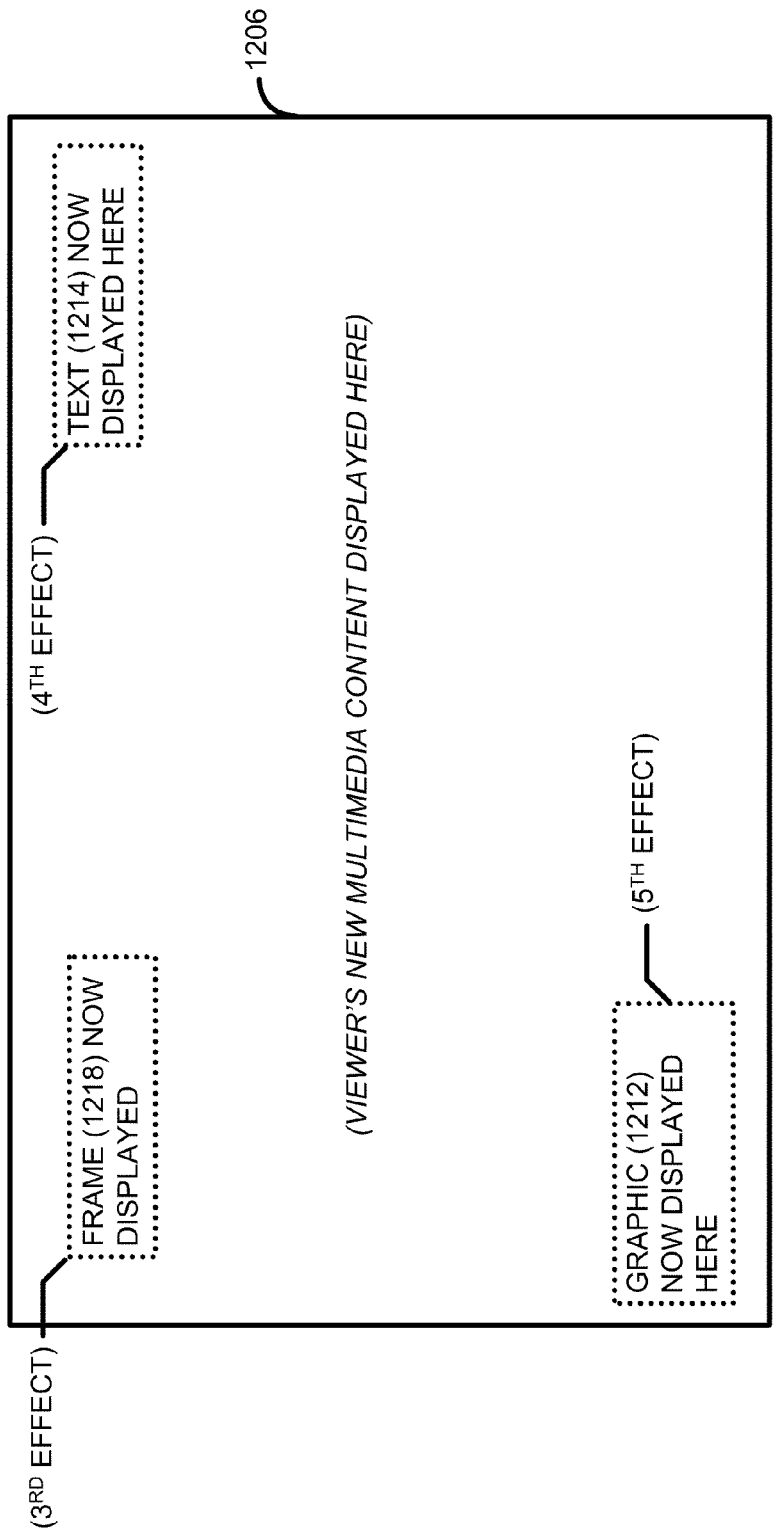
FIG. 12B is an exploded view of the display window in FIG. 12A, where the placement and layout of the objects corresponds to the placement and layout specified by the previous author and as stored in the project description file of FIG. 11A.

As another example, the display window 1206 shows a message corresponding to the fifth effect (graphics 1212) at the appropriate time. Again, a generic message comprising, for example, "GRAPHICS NOW DISPLAYED" may be shown, where the placement and layout of the graphics object corresponds to the placement and layout of the graphics specified by the previous author. FIG. 12B is an exploded view of the display window 1206 in FIG. 12A, where the placement and layout of the objects corresponds to the placement and layout specified by the previous author and as stored in the project description file 1109 of FIG. 11A. The messages are shown in conjunction with the viewer's multimedia content (e.g., movie title). For some embodiments, the user interface 1202 comprises a selection box 1213 for selecting a portion of the timeline-based template to use. As shown in the example of FIG. 12A, the selection box 1213 includes a portion of multimedia content 1253 and two effects 1222, 1224. When a user downloads the selected portion of the timeline-based template, object designators corresponding to the portion of multimedia content 1253 and the effects 1222, 1224 are also downloaded. The user simply resizes the selection box 1213. This allows the user to discard portions of the timeline-based template that is not of interest by cropping the timeline-based template. Also shown in FIG. 12A is a multimedia bar 1250, which shows the multimedia content being edited. Note that for a given project, the author is not limited to editing only one multimedia content. Rather, the project may comprise multiple sets of multimedia content. In the example of FIG. 12A, the multimedia content being edited comprises multimedia content 1251, multimedia content 1252, and multimedia content 1253, all of which may vary in length of time.

Figure 13:
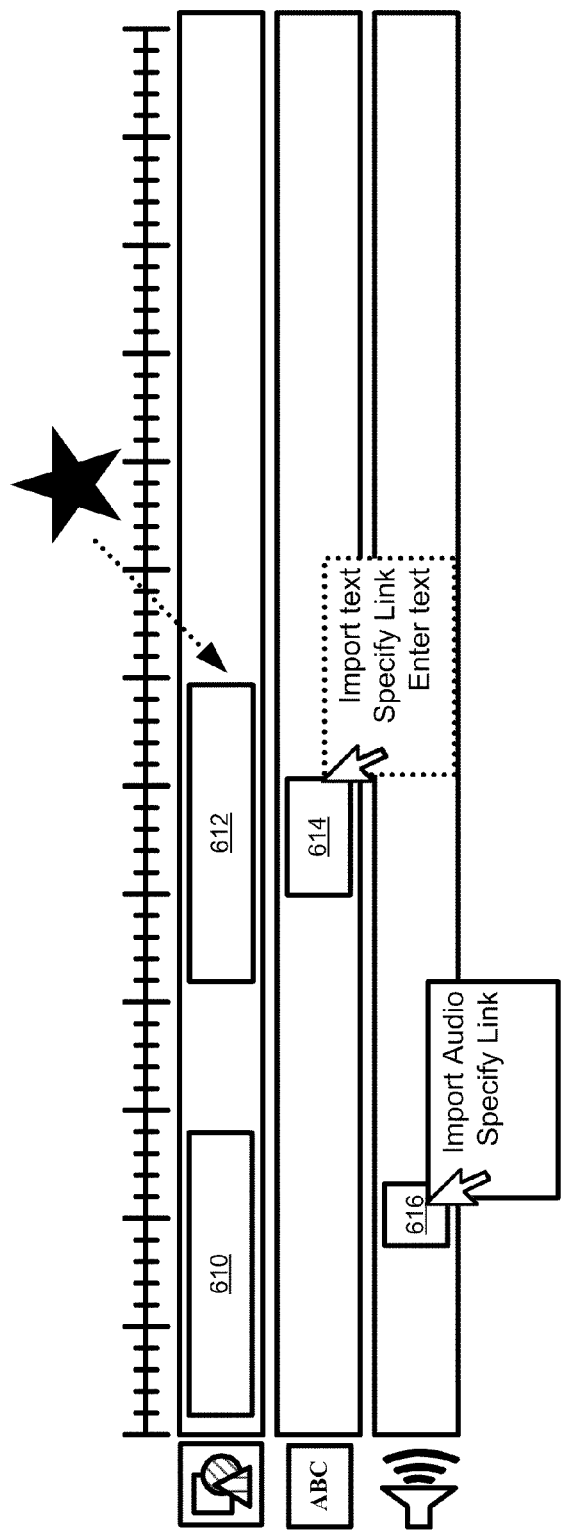
FIG. 13 illustrates one of various means for viewers to insert new content using the downloaded timeline-based template.

FIG. 13 illustrates one of various means for viewers to insert new content using the downloaded timeline-based template. As illustrated, for some embodiments, a viewer can invoke a context menu for inserting various object types (e.g., graphics, text, audio). For example, the viewer can import an audio file or specify a link to a particular audio file. For other object types such as customized text object, the viewer can manually enter text to be displayed. As shown, the viewer can also drag other objects (for example, a graphic or icon) into the timeline-based template, which will then be shown on the display area. By utilizing the timeline-based template created by a previous author, the viewer can mimic the previous author's project without having to re-create the entire production. Note that the use of a context menu and a drag-and-drop operation are just examples, and other means for populating the timeline-based template with objects may be incorporated as well.

Figure 14:
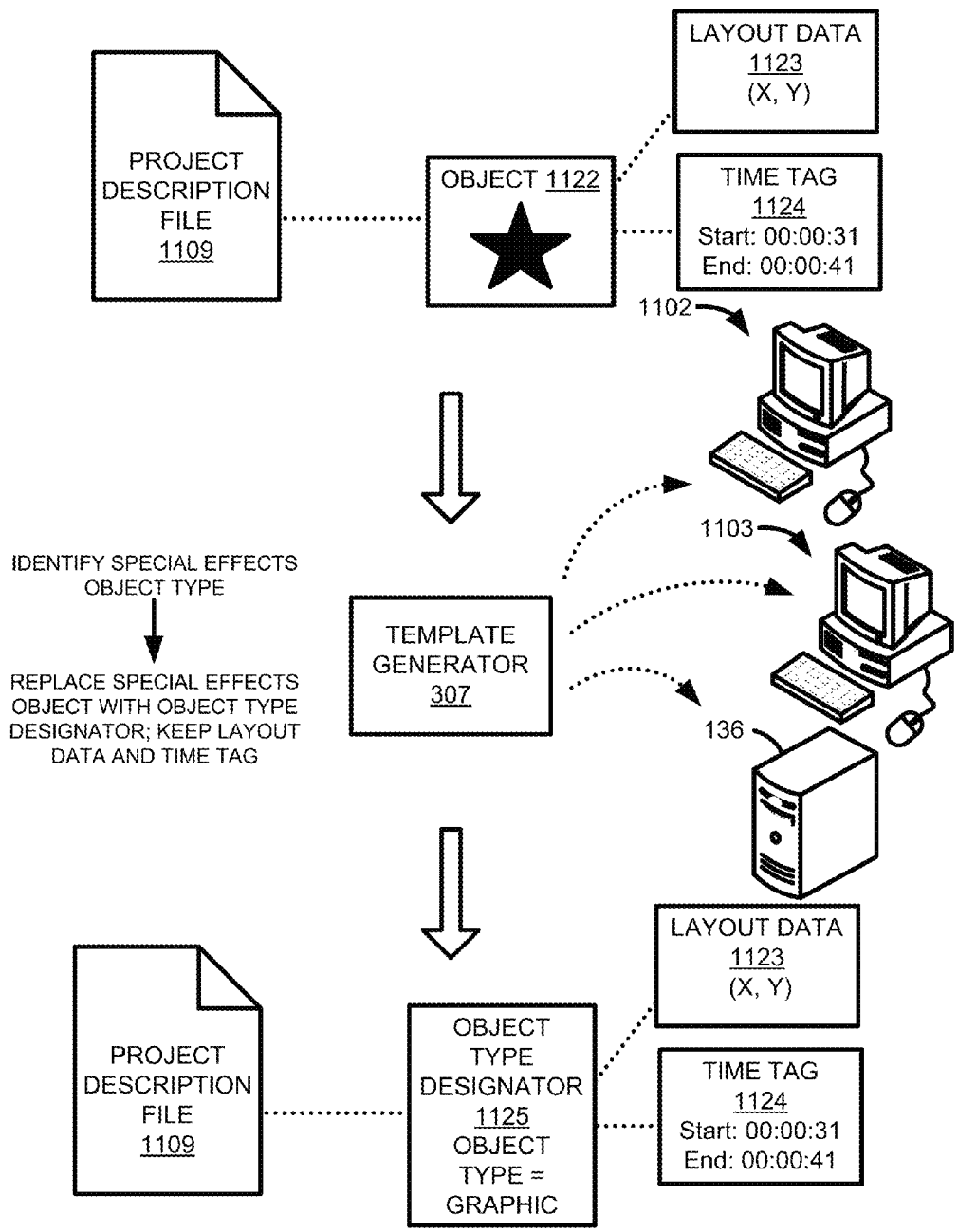
FIG. 14 illustrates use of a template generator configured to derive a timeline-based template from the project description file.

FIG. 14 illustrates use of a template generator configured to derive a timeline-based template from the project description file. Shown is a template generator 307 that may be implemented in either an editing system such as the first editing system 1102 in FIG. 11A, the second editing system 1103 in FIG. 11A, or the information sharing server 136. The template generator 307 is configured to derive a blank timeline-based template for users to populate with their own content. Generally, a blank timeline-based template refers to a template that does not include the original multimedia content and corresponding effects but that contain object type designators that show where the original author had inserted special effects into the edited multimedia content. Note that for some embodiments, a second user can download the blank timeline-based template and incorporate new effects that are stored locally on the second user's system. Alternatively, the second user can download the original author's effects with the author's permission. As described earlier, the project description file 1109 may contain one or more special effects objects 1122. Each special effects object 1122 has corresponding layout information 1123 and a timing data 1124, where the layout information 1123 specifies where the special effects object is displayed with respect to the edited multimedia content, and where the timing data 1124 specifies the timing (e.g., start and end time) of when the special effects object 1122 is displayed.

The template generator 307 receives a project description file 1109 and modifies the project description file 1109 by substituting an object type designator for each special effects object. Referring to the example in FIG. 14, the template generator 307 replaces the star graphic show (i.e., the special effects object 1122) with an object type designator 1125. The object type designator 1125 specifies a type such as, for example, a graphics type, a video type, an audio type, a text type, and so on. This information is later used by another user for populating the timeline-based template. Again, the template generator 307 may be implemented either at an editing system 1102 or at the information sharing server 136.

As discussed earlier in connection with FIG. 12A, the selection box 1213 allows a user to select a subset of the timeline-based template to use. This allows the user to discard portions of the timeline-based template that is not of interest. Note that for some embodiments, the user can utilize a similar selection box (or other means) for specifying a portion of a template of interest to be generated while previewing a previous author's work and prior to downloading a blank timeline-based template. That is, while previewing a previous author's production, a user can highlight a section of interest. A timeline-based template is then generated according to only the highlighted section and downloaded to an editing system for the user to populate.

Figure 15:
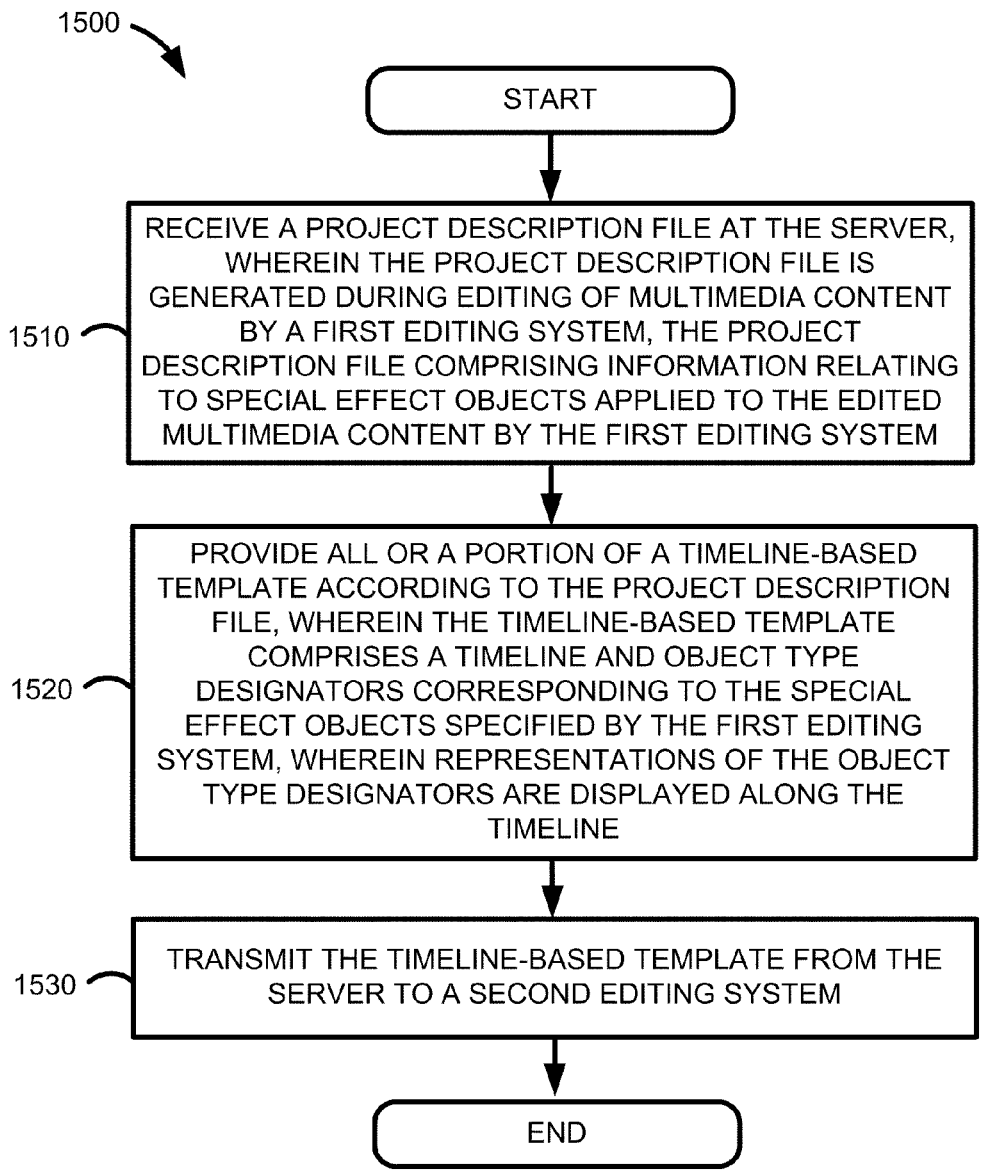
FIG. 15 is a flowchart of an embodiment for sharing multimedia editing techniques implemented in the system of FIG. 11A.

FIG. 15 is a flowchart of an embodiment for sharing multimedia editing techniques. It should be noted that if embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart 1500 of FIG. 15 shows a specific order of execution, it is understood that the order of execution may differ from that which is depicted. The flowchart 1500 depicts a method performed at a server for sharing video editing techniques by a user. In block 1510, a project description file is received at the server. The project description file is generated during editing of multimedia content by a first editing system, and the project description file comprises information relating to special effect objects applied to the edited multimedia content by the first editing system. In block 1520, all or a portion of a timeline-based template is provided according to the project description file, where the timeline-based template comprises a timeline and object type designators corresponding to the special effect objects specified by the first editing system. Representations of the object type designators are displayed along the timeline. In block 1530, the timeline-based template is transmitted from the server to a second editing system.

Figure 16:
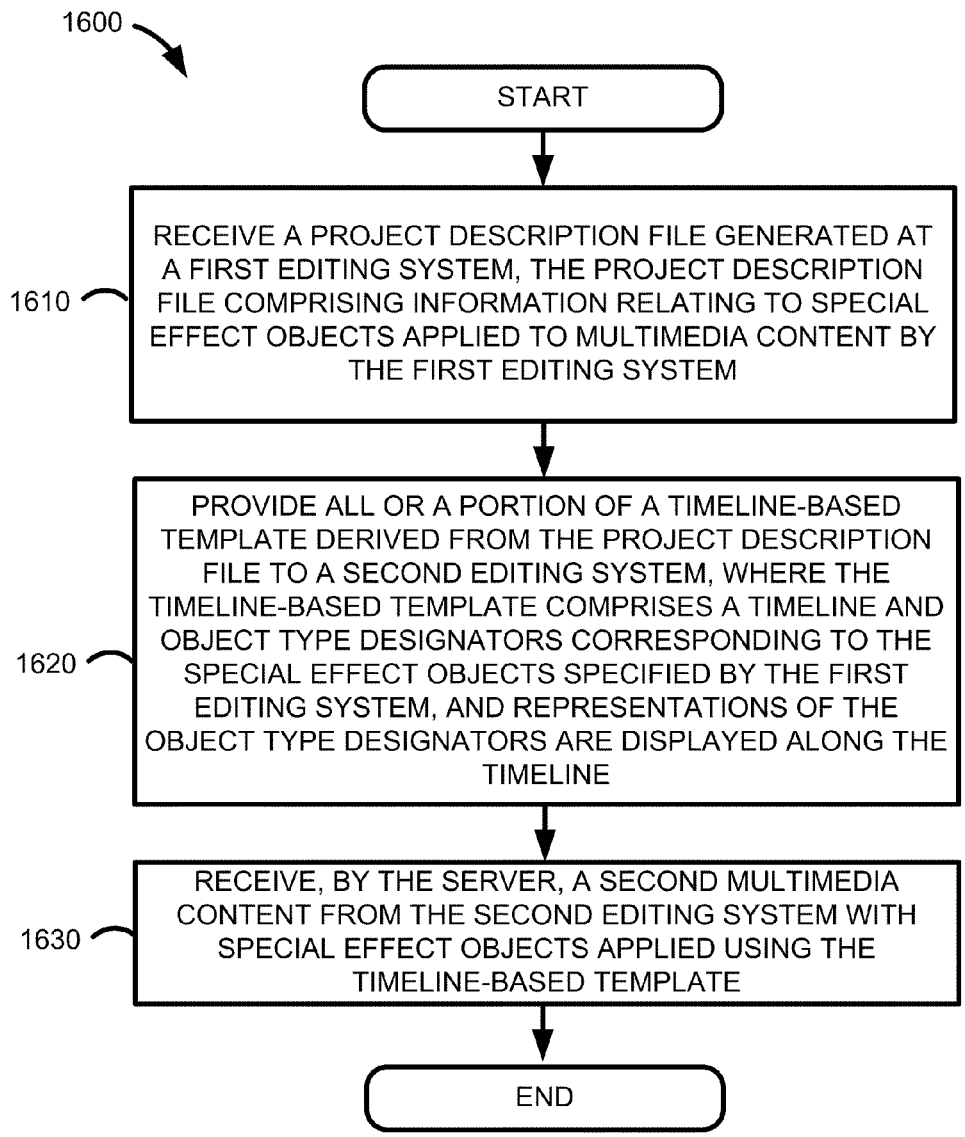
FIG. 16 is a flowchart of an alternative embodiment for sharing multimedia editing techniques implemented in the system of FIG. 11A.

FIG. 16 is a flowchart of an embodiment for sharing multimedia editing techniques. It should be noted that if embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart 1600 of FIG. 16 shows a specific order of execution, it is understood that the order of execution may differ from that which is depicted. The flowchart 1600 depicts a method performed at a server for sharing video editing techniques by a user. In block 1610, the server receives a project description file generated at a first editing system, the project description file comprising information relating to special effect objects applied to multimedia content by the first editing system. In block 1620, the server provides all or a portion of a timeline-based template derived from the project description file to a second editing system.

The timeline-based template comprises a timeline and object type designators corresponding to the special effect objects specified by the first editing system, and representations of the object type designators are displayed along the timeline. In block 1630, a second multimedia content is received by the server from the second editing system with special effect objects applied using the timeline-based template.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method performed at a server for sharing video editing techniques, comprising:

receiving, by the server, a project description file from a first editing system, wherein the project description file is generated during editing of multimedia content by the first editing system prior to the server receiving the project description file, the project description file comprising information relating to special effect objects applied to the multimedia content by the first editing system;

providing and displaying, by the server, the edited multimedia content and at least a portion of a timeline-based template according to the project description file, wherein the timeline-based template comprises a timeline and object type designators corresponding to the special effect objects specified by the first editing system, wherein representations of the object type designators are displayed along the timeline, wherein the special effect objects comprise effects previously applied to the multimedia content to generate the edited multimedia content; and transmitting, by the server, the timeline-based template from the server to a second editing system.

2. The method of claim 1, wherein the project description file further comprises timing data for each of the object type designators and layout information for each of the object type designators.

3. The method of claim 2, wherein the timing data corresponds to application of the special effect objects to the edited multimedia content with respect to time.

4. The method of claim 2, wherein the timing data comprises a start time and an end time of each special effects object.

5. The method of claim 1, further comprising for each special effects object specified by the project description file, at the second editing system, substituting a corresponding object type designator for each special effects object and arranging the representations of the object type designators along the timeline according to timing data of each multimedia editing object.

6. The method of claim 1, wherein the project description file comprises an extensible markup language (XML) file.

7. The method of claim 1, wherein the project description file specifies a relationship between the special effects objects and timing data of each of the special effects objects.

8. The method of claim 1, wherein the special effects objects comprise one or more of: graphics, video, audio, and text.

9. The method of claim 1, wherein the object type designators comprise a designator for graphics, a designator for video, a designator for audio, and a designator for text.

10. The method of claim 1, wherein providing a timeline-based template further comprises providing navigation controls for controlling playback and for inserting content according to the object types shown on the timeline.

11. The method of claim 1, wherein transmitting a portion of the timeline-based template from the server to a second editing system comprises sending a selected portion of the timeline-based template, wherein the portion of the timeline-based template is selected by the second editing system.

12. The method of claim 1, wherein transmitting the timeline-based template from the server to a second editing system comprises transmitting the object type designators with the special effect objects specified by the first editing system to the second editing system.

13. The method of claim 1, wherein transmitting the timeline-based template from the server to a second editing system comprises transmitting the object type designators without the special effect objects to the second editing system.

14. A method performed at a server for sharing video editing techniques, comprising:
- receiving, by the server, a project description file generated at a first editing system during editing of multimedia content by the first editing system, the project description file comprising information relating to special effect objects applied to the multimedia content by the first editing system;
- providing and displaying, by the server, the edited multimedia content and at least a portion of a timeline-based template derived from the project description file to a second editing system, wherein the timeline-based template comprises a timeline and object type designators corresponding to the special effect objects specified by the first editing system, wherein representations of the object type designators are displayed along the timeline, wherein the special effect objects comprise effects previously applied to the multimedia content to generate the edited multimedia content; and
- receiving, by the server, from the second editing system a second multimedia content with special effect objects applied using the timeline-based template provided by the server to the second editing system.

15. The method of claim 14, wherein the representations of the object type designators comprise thumbnails.

16. The method of claim 14, wherein the timeline-based template is derived by the first editing system.

17. The method of claim 14, wherein the timeline-based template is derived by the server.

18. The method of claim 14, wherein the timeline-based template is derived by substituting the special effects objects with object type designators.

19. The method of claim 18, wherein substituting the special effects objects with object type designators is performed at one of: the server, the second editing system, and the first editing system prior to providing the timeline-based template derived from the project description file to the second editing system.

20. The method of claim 18, wherein the special effects objects comprise one or more of: graphics, video, audio, and text.

21. The method of claim 14, wherein the object type designators comprise a designator for graphics, a designator for video, a designator for audio, and a designator for text.

22. The method of claim 14, wherein providing a portion of the timeline-based template to the second editing system comprises providing a selected portion of the timeline-based template, wherein the portion of the timeline-based template is selected by the second editing system.

23. The method of claim 14, further comprising transmitting the object type designators with the special effect objects specified by the first editing system to the second editing system.

24. The method of claim 14, further comprising transmitting the object type designators without the special effect objects to the second editing system.

25. A system for sharing multimedia editing techniques, comprising:
- a server having a hardware processor;
- a project sharing application executable by the processor for receiving a project description file from a first editing system, the project description file comprising information relating to application of special effect objects applied to a multimedia file during editing of the multimedia content by the first editing system; and
- a template generator executable by the processor for deriving a timeline-based template based on the project description file, wherein the server is configured to send the timeline-based template to a second editing system, wherein the special effect objects comprise effects previously applied to the multimedia content to generate the edited multimedia content, wherein the template generator derives a timeline-based template by replacing the special effects objects with object type designators, wherein the timeline-based template comprises layout information and timing data for each object type designator, and wherein the timing data corresponds to application of the special effect objects to the edited multimedia content with respect to time.

26. The system of claim 25, wherein replacing the special effects objects with object type designators is performed at one of: the server, the first editing system, and the second editing system.

* * * * *